(12) United States Patent
Kezios et al.

(10) Patent No.: US 9,656,418 B2
(45) Date of Patent: May 23, 2017

(54) CO-POLYESTER PACKAGING RESINS PREPARED WITHOUT SOLID-STATE POLYMERIZATION, A METHOD FOR PROCESSING THE CO-POLYESTER RESINS WITH REDUCED VISCOSITY CHANGE AND CONTAINERS AND OTHER ARTICLES PREPARED BY THE PROCESS

(75) Inventors: Peter S. Kezios, Wilmington, NC (US); Helen Codd, Wilmington, NC (US); Kevin Richard Harrison, New Madison, OH (US)

(73) Assignee: DAK AMERICAS LLC, Charlotte, NC (US)

( * ) Notice: Subject to any disclaimer, the term of this patent is extended or adjusted under 35 U.S.C. 154(b) by 1628 days.

(21) Appl. No.: 11/407,990

(22) Filed: Apr. 21, 2006

(65) Prior Publication Data
US 2007/0248778 A1  Oct. 25, 2007

(51) Int. Cl.
| | |
|---|---|
| *B29B 9/06* | (2006.01) |
| *B29C 49/00* | (2006.01) |
| *B29C 49/12* | (2006.01) |
| *B29C 51/00* | (2006.01) |
| *C08G 63/181* | (2006.01) |
| *B29C 45/00* | (2006.01) |

(Continued)

(52) U.S. Cl.
CPC .......... *B29C 49/0005* (2013.01); *B29C 49/12* (2013.01); *B29C 51/002* (2013.01); *C08G 63/181* (2013.01); *B29B 2911/1402* (2013.01); *B29B 2911/1404* (2013.01); *B29B 2911/14026* (2013.01); *B29B 2911/14033* (2013.01); *B29B 2911/14106* (2013.01); *B29B 2911/14133* (2013.01); *B29C 45/0001* (2013.01); *B29C 49/06* (2013.01); *B29C 2035/0822* (2013.01); *B29K 2067/00* (2013.01); *B29K 2105/0094* (2013.01); *B29L 2031/3061* (2013.01); *Y10T 428/1352* (2015.01)

(58) Field of Classification Search
USPC ........................................ 428/35.7, 531, 537
See application file for complete search history.

(56) References Cited

U.S. PATENT DOCUMENTS 3,014,011 A * 12/1961 Zoetbrood ..................... 528/498
3,822,332 A    7/1974 Hrach et al.
(Continued)

FOREIGN PATENT DOCUMENTS

CN          1753938 A       3/2006
DE          10356298 A  *  12/2004
(Continued)

OTHER PUBLICATIONS

Wunderlich, B. and Pyda, M. 2004. "Thermodynamic Properties of Polymers" Encyclopedia of Polymer Science and Technology, p. 172.*

(Continued)

*Primary Examiner* — Ellen S Wood
(74) *Attorney, Agent, or Firm* — Oblon, McClelland, Maier & Neustadt, L.L.P.

(57) ABSTRACT

A method of processing a polyester composition without changing the intrinsic viscosity of the polyester polymer by more than 0.025 dL/g such as injection molding a PET resin to form a bottle perform and blow molding a container from the bottle preform.

37 Claims, 6 Drawing Sheets

(51) Int. Cl.
  *B29C 49/06*   (2006.01)
  *B29C 35/08*   (2006.01)
  *B29K 67/00*   (2006.01)
  *B29K 105/00*  (2006.01)
  *B29L 31/30*   (2006.01)

(56) References Cited

U.S. PATENT DOCUMENTS

| | | | |
|---|---|---|---|
| 4,051,112 A * | 9/1977 | Kuratsuji et al. | 528/272 |
| 4,289,874 A * | 9/1981 | Bockrath | 528/487 |
| 5,573,820 A * | 11/1996 | Harazoe et al. | 428/35.7 |
| 5,656,221 A * | 8/1997 | Schumann et al. | 264/85 |
| 5,656,719 A * | 8/1997 | Stibal et al. | 528/491 |
| 5,945,460 A * | 8/1999 | Ekart et al. | 521/48 |
| 5,968,429 A * | 10/1999 | Treece et al. | 264/102 |
| 5,980,797 A * | 11/1999 | Shelby et al. | 264/85 |
| 6,099,778 A * | 8/2000 | Nelson et al. | 264/176.1 |
| 6,551,087 B1 * | 4/2003 | Martin | 425/67 |
| 6,592,350 B1 * | 7/2003 | Chszaniecki | 425/67 |
| 6,740,733 B2 * | 5/2004 | Lee et al. | 528/499 |
| 7,157,032 B2 * | 1/2007 | Eloo | 264/143 |
| 7,192,545 B2 * | 3/2007 | Ekart et al. | 264/211.13 |
| 7,358,322 B2 * | 4/2008 | Jernigan et al. | 528/271 |
| 7,358,324 B2 * | 4/2008 | Chen et al. | 528/288 |
| 7,368,522 B2 * | 5/2008 | Jernigan et al. | 528/271 |
| 7,459,113 B2 | 12/2008 | Colhoun et al. | |
| 8,039,581 B2 * | 10/2011 | Ekart et al. | 528/499 |
| 8,309,683 B2 * | 11/2012 | Ekart et al. | 528/499 |
| 8,324,339 B2 * | 12/2012 | Bruckmann | 528/308.1 |
| 2005/0062186 A1 * | 3/2005 | Fellinger | 264/102 |
| 2005/0065318 A1 * | 3/2005 | Jernigan et al. | 528/480 |
| 2005/0110182 A1 * | 5/2005 | Eloo | 264/69 |
| 2005/0154183 A1 * | 7/2005 | Ekart et al. | 528/486 |
| 2005/0161863 A1 | 7/2005 | Otto et al. | |
| 2005/0196566 A1 | 9/2005 | Colhoun et al. | |
| 2005/0215753 A1 | 9/2005 | Otto et al. | |
| 2006/0046004 A1 | 3/2006 | Ekart et al. | |
| 2007/0128389 A1 * | 6/2007 | Kezios et al. | 428/35.7 |
| 2008/0071061 A1 * | 3/2008 | Bruckmann | 528/480 |
| 2009/0131627 A1 | 5/2009 | Colhoun et al. | |
| 2011/0034665 A1 | 2/2011 | Colhoun et al. | |

FOREIGN PATENT DOCUMENTS

| | | | | |
|---|---|---|---|---|
| EP | 1 574 538 A1 | 9/2005 | | |
| JP | 05070567 A * | 3/1993 | | C08G 63/181 |
| JP | 2005-255998 | 9/2005 | | |
| WO | WO 2005/061581 A1 | 7/2005 | | |
| WO | WO 2006/028748 A2 | 3/2006 | | |
| WO | WO 2006/028748 A3 | 3/2006 | | |

OTHER PUBLICATIONS

Extended European Search Report issued Jul. 25, 2011, in European Patent Application No. 07761024.4.
European Communication issued Aug. 11, 2011, in Patent Application No. 07761024.4.
Chinese Office Action dated Jan. 18, 2011 in corresponding Chinese Application No. 200780018704.X (English Translation Only).
Office Action issued Jun. 17, 2011 in Japan Application No. 2009-506798 (With English Translation).
Russian Office Action issued on Apr. 7, 2011 in corresponding Russian Application No. 2008145894/05 (059971) (with an English Translation).
Office Action issued May 25, 2012 in Chinese Patent Application No. 200780018704.X (English translation only).
Office Action issued Nov. 8, 2011, in Japanese Patent Application No. 2009-506798 (English translation only).
Office Action issued Apr. 5, 2012, in European Patent Application No. 07 761 024.4.
Canadian Office Action issued Oct. 5, 2012 in connection with corresponding Canadian Patent Application No. 2,648,815, filed Apr. 20, 2007.
Office Action issued Sep. 16, 2013 in Korean Patent Application No. 10-2008-7028421 (with English language translation).
Canadian Office Action issued Feb. 25, 2014 in connection with corresponding Canadian Application No. 2,648,815, filed Apr. 20, 2007.

* cited by examiner

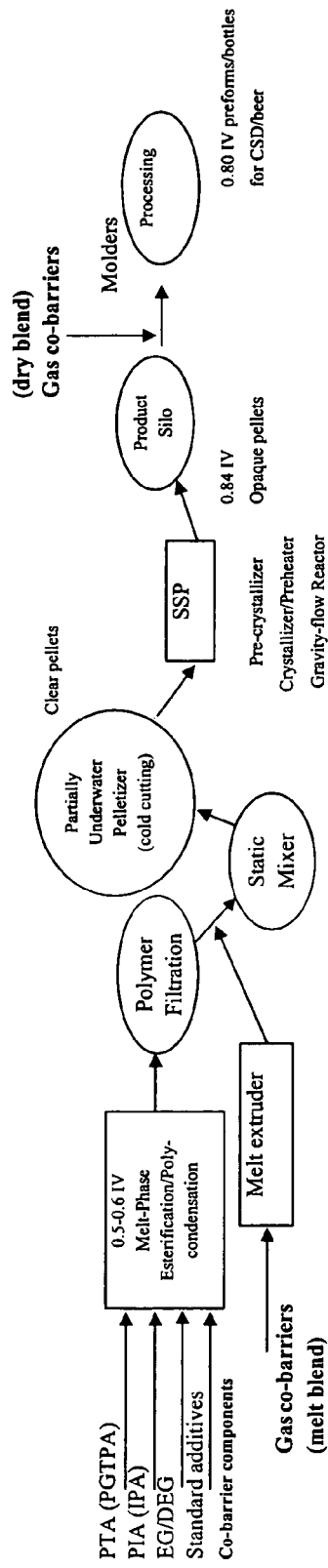
FIG. 1 SSP Process
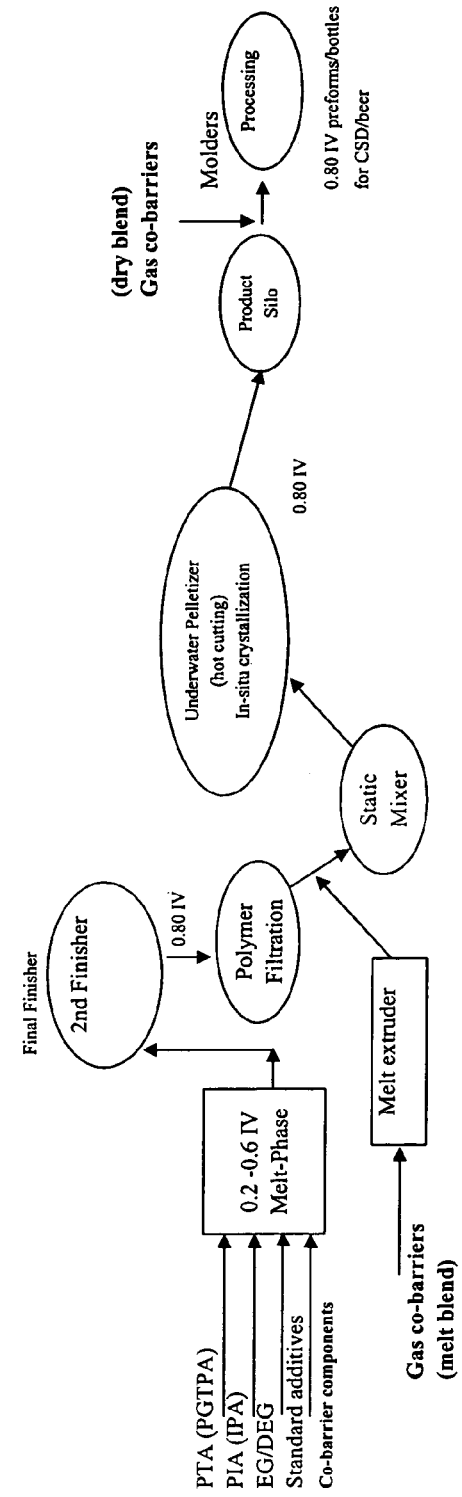
FIG. 2 Non-SSP Process

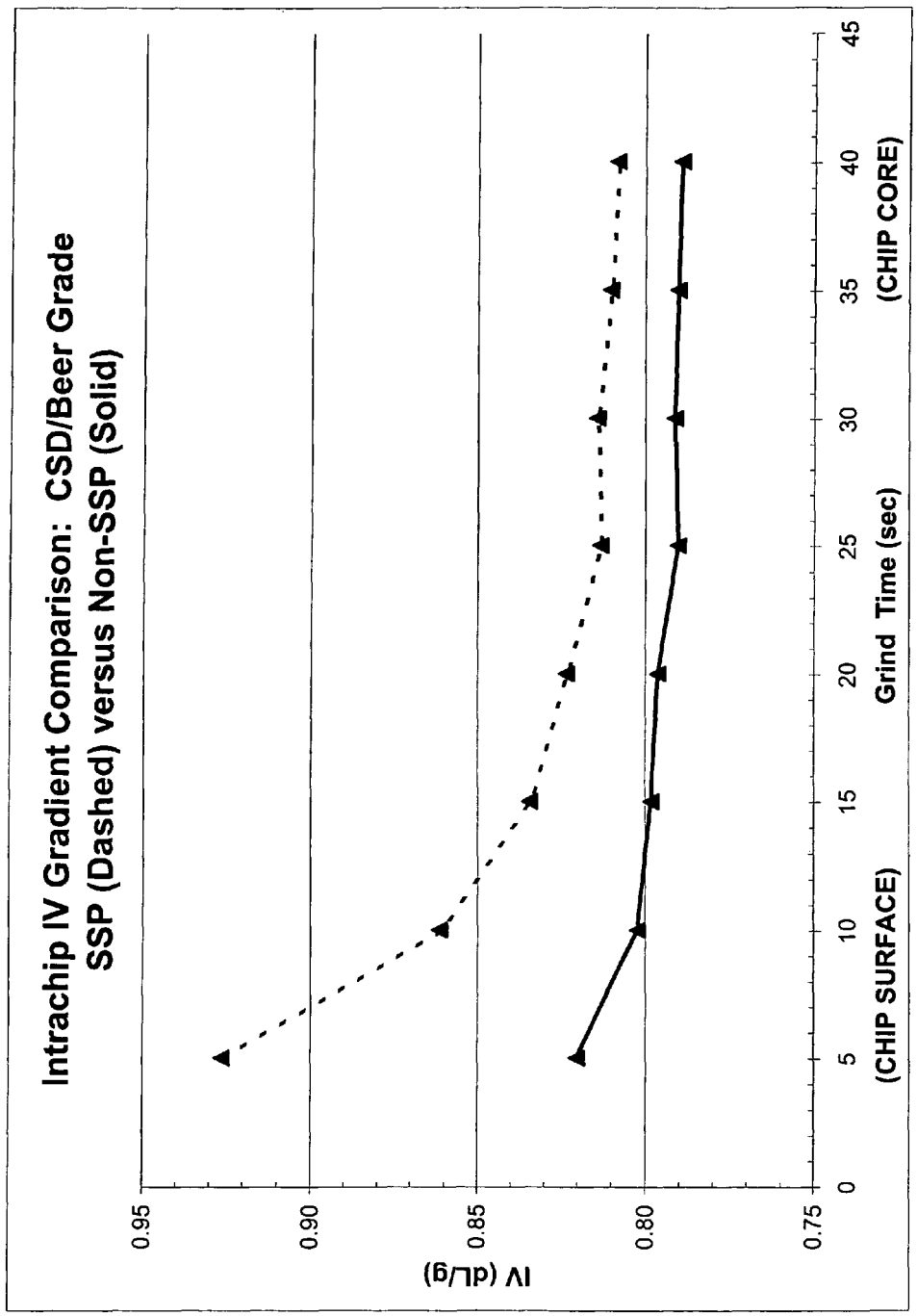

CO-POLYESTER PACKAGING RESINS PREPARED WITHOUT SOLID-STATE POLYMERIZATION, A METHOD FOR PROCESSING THE CO-POLYESTER RESINS WITH REDUCED VISCOSITY CHANGE AND CONTAINERS AND OTHER ARTICLES PREPARED BY THE PROCESS

BACKGROUND OF THE INVENTION

Field of the Invention

The invention relates to a method for processing a polyester resin that includes melting and subsequently solidifying the polyester resin to form a shaped article without decreasing the intrinsic viscosity of the polyester resin by more than 0.025 dL/g. The invention further relates to molded articles prepared by the method and to the polyester resins capable of undergoing processing without a decrease in intrinsic viscosity of more than 0.025 dL/g.

Description of the Related Art

Polyester resins including resins such as poly(ethylene terephthalate) (PET), poly(butylene terephthalate) (PBT), poly(ethylene naphthalate) (PEN), poly(trimethylene terephthalate) (PTT), and poly(trimethylene naphthalate) (PTN), are conventionally used as resins in the manufacture of containers such as beverage bottles. Properties such as flexibility, good impact resistance, and transparency, together with good melt processability, permit polyester resins to be widely used for this application. The term resin as it is used herein includes all of the aforementioned materials.

The starting feedstocks for polyester resins are petroleum derivatives such as ethylene, which is obtained from petroleum or natural gas, and para-xylene, which is typically obtained from petroleum.

Polyester resins are generally made by a combined esterification/polycondensation reaction between monomer units of a diol (e.g., ethylene glycol (EG)) and a dicarboxylic acid (e.g., terephthalic acid (TPA)). The terms carboxylic acid and/or dicarboxylic acid, as used herein, include ester derivatives of the carboxylic acid and dicarboxylic acids. Esters of carboxylic acids and dicarboxylic acids may contain one or more C1-C6 alkyl groups (e.g., methyl, ethyl, propyl, iso-propyl, butyl, iso-butyl, tert-butyl, pentyl, hexyl and mixtures thereof) in the ester unit, for example, dimethyl terephthalate (DMT).

In conventional esterification/polycondensation processes, polyester may be formed, for example, by first producing a prepolymer of low molecular weight and low intrinsic viscosity (IV) (e.g., a mixture of oligomers), for example, by reacting a diol and a dicarboxylic acid in a melt phase reaction. The formation of the oligomers may be carried out by reacting a slurry of diol and dicarboxylic acid monomer units in an esterification reactor. EG may be lost to evaporation during the esterification reaction which may be carried out at high temperatures. Therefore the slurry of diol and dicarboxylic acid may contain an excess of EG, for example the diol and dicarboxylic acid may be present in a molar ratio of from about 1.2 to about 2.5 based on the total glycol to total di-acid. Further pre-polycondensation and polycondensation of the oligomers can be carried out to provide a resin mixture having an IV of from 0.50 to 0.65. Such resin mixtures are suitable in various applications such as fibers/filaments, fiber chips, or bottle-resin precursors. Amorphous clear base chips having an IV of from 0.50 to 0.65 may be subjected to solid-state polymerization (SSP) to increase the molecular weight (e.g., to an IV of from 0.74 to 0.76 for water bottle applications, 0.83 to 0.85 for CSD/Beer bottles, etc.). The solid-state polymerization (SSP) process unit can result in the resin undergoing crystallization which forms opaque pellets.

A continuous polyester melt-phase polycondensation process usually consists of three reaction steps: (i) esterification to form low molecular weight oligomers, (ii) pre-polymerization of the oligomers to form a pre-polymer, and (iii) polycondensation to form a polymer with an intermediate molecular weight or intrinsic viscosity (e.g., a target intrinsic viscosity of from 0.50 to 0.65).

The three reaction steps (i), (ii), and (iii) above, can be carried out to achieve the target intrinsic viscosity in from 2 to 6 reactors using existing melt-phase process technology. In general, esterification is conducted in one or two vessels to form a mixture of low molecular weight oligomers with a low degree of polymerization (e.g., about up to 7 monomer unit pairs reacted). The oligomers are then pumped to one or two pre-polymerization vessels where higher temperatures and lower pressures aid in removing water and EG. The degree of polymerization then increases to a level of 15 to 20 repeating units. The temperatures are further increased and pressures are further reduced in the final one or two vessels to form a polymer ready to be cut into pellets for example, or to be spun directly into fibers or filaments.

Esterification and pre-polymerization vessels may be agitated. Polycondensation vessels (e.g., finishers, wiped-film reactors etc.) may have agitators designed to generate very thin films. Temperatures and hold-up times are optimized for each set of vessels to minimize the degradation and other side reactions. Some by-products that may be generated by the polyester melt phase reaction include diethylene glycol (DEG), acetaldehyde, water, cyclic oligomers, carboxyl end groups, vinyl end groups, and anhydride end groups.

Both time and temperature are two variables that are preferably controlled during an esterification/polycondensation reaction. With higher reaction temperatures, the total reaction time is significantly reduced and less residence time and/or fewer reactors are needed.

Alternatively to such a continuous production method, polyesters may be prepared using a batch method. In a batch method the diol and dicarboxylic acid units are mixed together in a single reactor. In some cases more than one reactor (e.g., reaction vessel) may be used if necessary. The diol/dicarboxylic acid mixture is heated to cause the monomer units to undergo a condensation reaction. The by-products of the condensation reaction may include water or an alcohol. By conducting the reaction under reduced pressure or by subjecting the reaction mixture to reduced pressure during the final stages of the reaction, volatile by-products of the reaction can be removed thus driving the reaction to completion.

Certain physical and chemical properties of polymeric materials are negatively affected by long exposure to elevated temperature, especially if the exposure is in an oxygen-containing atmosphere or at temperatures above, for example, 250° C. Conventional methods for preparing polyester resins such as PET may suffer from disadvantages associated with the need to carry out a solid state polymerization (SSP) which subjects the resin to a long heat history and/or may require high capital expenditure.

The production of a polyester resin such as PET may be carried out directly from a melt phase of the monomer units without any final solid-state polymerization. For example, a batch process may be carried out at a sufficient temperature, for a sufficient time and at a sufficient pressure to drive the polycondensation reaction to completion thus avoiding the need for any subsequent finishing (e.g., final reaction).

Solid-state polycondensation is an important step in some conventional processes used to manufacture high molecular weight polyester resins for bottle, food-tray, and tire-cord applications. The clear amorphous pellets (0.50 to 0.65 IV) produced by conventional melt polycondensation reaction processes may be further polymerized in the solid state at a temperature substantially higher than the resin's glass transition temperature but below the resin's crystalline melting point. The solid state polymerization is carried out in a stream of an inert gas (usually nitrogen under continuous operation) or under a vacuum (usually in a batch rotary vacuum dryer). At an appropriate SSP temperature, the functional end groups of the polymer (e.g., PET) chains are sufficiently mobile and react with one another to further increase the molecular weight.

A conventional process for producing polyester resins for container applications including melt-phase polycondensation and solid state polymerization is shown schematically in FIG. 1 wherein the monomer components of a polyester resin such as PET are mixed in a melt-phase esterification/polycondensation reactor. The reaction is carried out to provide a molten resin having an intrinsic viscosity (IV) of from 0.5 to 0.65. The molten product obtained by the melt-phase esterification/polycondensation is then subjected to a polymer filtration. Optionally a co-barrier resin may be added to the filtered, molten polymer by extruding the co-barrier resin and adding the extrudate to the filtered, molten resin obtained from the melt-phase esterification/polycondensation. The mixed streams, or the polyester stream obtained from polymer filtration may then be pumped into a mixer. A static mixer may be used to ensure that the polyester resin and any co-barrier resin are sufficiently mixed.

The melt-phase esterification/polycondensation is typically carried out in a plurality of reactors. Therefore, the monomers may be added to a first esterification reactor to form a low IV material. As the oligomers pass through the remaining reactors, the IV is subsequently raised as the polycondensation reaction proceeds sequentially through a series of reactors. The material in molten form that is pumped from the static mixer is subjected to solidification and pelletizing. The molten material may be solidified by passage of strands or filaments of the material formed by pumping the material through, for example, a die with a series of orifices. As the molten polyester resin is passed through an orifice, a continuous strand is formed. By passing the strands through water, the strands are immediately cooled to form a solid. Subsequent cutting of the strands provides pellets or chips which, in a conventional process, are then transferred to a solid-state polymerization stage (i.e., SSP).

In conventional processes for preparing polyester resins and even in some processes which avoid the use of a solid-state polymerization after polymerization is complete, the molten polymerized resin may be pumped through a die to form multiple strands. The molten resin exiting from the die is quickly quenched in water to harden the resin. As a result of the quick cooling (e.g., water quench) the molten polyester does not have time to crystallize and is solidified in an amorphous state. Solidified polyester strands, or pellets derived from cut strands, are clear, transparent and in an amorphous state.

The SSP may include several individual reactors and/or processing stations. For example, the SSP may include a pre-crystallization step wherein the chips and/or pellets are transformed from an amorphous phase into a crystalline phase. The use of a crystalline phase polyester resin is important in later steps of the SSP because the use of amorphous polyester chips may result in clumping of the pellets since an amorphous state polyester resin may not be sufficiently resistant to adherence between pellets and/or chips. The SSP process further includes a crystallizer (e.g., crystallization step), a pre-heater, a cooler, and an SSP reactor.

Some manufacturing processes do not include an SSP. Processing a polyester resin directly from a melt phase condensation to obtain pre-forms for blow molding applications is described in U.S. Pat. No. 5,968,429 (incorporated herein by reference in its entirety). The polymerization is carried out without an intermediate solidification of the melt phase and permits the continuous production of molded polyester articles (e.g., pre-forms), from a continuous melt phase reaction of the starting monomers.

After pre-crystallization, the chips and/or pellets may be subjected to a final crystallization. A final crystallization may include, for example, proper heating of the chips (pellets, pastilles, granules, round particles, etc.) at appropriate temperatures. Once the polyester resin is in a crystallized state, the pellets and/or chips are preheated and ready for transfer to the top of a counter-flow SSP reactor (parallel to the pre-heater) via a pneumatic system (e.g., Buhler technology). If a tilted crystallizer is stacked above the SSP reactor, the hot/crystallized chips then enter the SSP reactor by the rotating screw of the crystallizer (e.g., Sinco technology). The SSP reactor can be considered as a moving bed of chips that move under the influence of gravity. The chips have a slow down-flow velocity of from 30 to 60 mm/minute and the nitrogen has a high up-flow velocity of about 18 m/minute. A typical mass-flow ratio of nitrogen to PET is in the range of 0.4-0.6. In a gravity-flow reactor, the pellets and/or chips are subjected to elevated temperatures for periods of up to 15 hours. The heating and nitrogen sweeping through the gravity-flow reactor will drive the polycondensation reaction and result in longer chain lengths and, concurrently, a higher IV of the resins.

After passing through the gravity-flow reactor, pellets and/or chips of a wide range of IV can be formed, e.g., having an average IV of about 0.84 dL/g, e.g., for CSD/Beer. The pellets and/or chips have an opaque characteristic due to their crystallinity. The crystalline material is transferred to a product silo for storage and/or packaging. The finished product in a crystalline state and having an IV of about 0.84 dL/g, e.g., for CSD/Beer, can be further mixed with other co-barrier resins (powders, granules, pellets, pastilles, etc.) by molders or processors who purchase the polyester resins for manufacturing, for example, bottles and/or containers.

Thus, in a conventional process, a melt-phase polycondensation process may be used to make clear amorphous pellets (typically, 0.5-0.65 IV) as precursors to bottle resins. The amorphous pellets are first pre-crystallized, crystallized, and/or preheated, then subjected to SSP in a gravity flow reactor (e.g., a reactor that is not agitated). After crystallization, the resin pellets become opaque and do not stick together if the temperature of SSP is at least 10° C. below the onset of the melting temperature of the resin pellets. In a direct high IV melt process, only the melt process (no SSP) is used to make a variety of bottle resins (e.g., 0.72-0.78 IV for water bottles, 0.83-0.87 IV for CSD/Beer bottles) as desired. In a direct high IV melt process, a finisher (e.g., a wiped- or thin-film evaporator) may be used to effectively and rapidly remove the reaction by-products such as EG (major), water, acetaldehyde, and so on. Immediate removal of EG/water under high temperatures drives the polycondensation reaction equilibrium toward the polymer side.

PET or other polyester resins are known to have hygroscopic behavior (e.g., absorb water from the atmosphere), so pellets obtained by cutting water-quenched strands contain significant quantities of water. Conventionally, the pellets may be dried by passing dry air over the pellets or by heating. Heating for an extended period at an elevated temperature may lead to problems because the amorphous polyester (e.g., PET) pellets may have a tendency to stick to one another.

In preform molding processes, the pellets and/or chips are typically dried before molding. After proper drying, the pellets and/or chips may have a water content of not more than 50 ppm. The chips and/or pellets are then processed, for example, in the form of preforms, by injection molding. Because residual water is present in the resin during the injection molding process which is carried out at elevated temperatures (e.g., temperatures above 200° C.), the IV of the resin may be reduced, for example by hydrolytic degradation. The starting chips may be about 0.84 IV. The IV in subsequent injection-molded preforms formed from the starting resin may be about 0.80 IV. Thus, an approximate 5% reduction in IV of about 0.04 dL/g may take place in going from the chips and/or pellets to the pre-form prepared by injection molding when the chips and/or pellets have been properly dried and contain at most about 50 ppm water. Polyester material containing a greater amount of water can undergo thermal and hydrolytic degradation. Excess water in the resin can lead to a substantial reduction in IV of 30% or more.

In order to account for the loss (e.g., reduction) in IV occurring during processing, a resin having a higher IV than the IV desired for the end product must be manufactured. Typically, the difference in IV in the resin before forming a preform and the IV of the resin after forming of the preform is approximately 0.03-0.05 IV dL/g. Thus, in order to produce a molded article having a target IV of 0.80, the base resin must be first manufactured to an IV of 0.83-0.85. Because a higher IV is needed, longer polymerization times are required during the production of the base resin. Longer polymerization times result in a reduction of throughput capacity.

The particular mechanism by which the resin becomes reduced in IV during processing is not known, but it is generally understood to be attributable to one or more degradation processes including thermal, hydrolytic, oxidative, shear induced or free radical. Degradation of the resin may be accompanied by the formation of side products such as acetaldehyde.

The reduction in IV observed for some polyester resins occurs when the base resin is processed. The processing normally includes a step wherein the resin is melted and/or subjected to high shear. Such processing can include injection molding or other processing whereby the base resin is melted or transformed to a fluid state from a solid state then cooled to form a solid.

Methods of processing polyester resins which do not result in a decrease in the IV of the polyester resin would be desirable because the producer of the polyester resin may achieve greater throughput and hence productivity. Concurrently, the resin processor (e.g., injection molder) may realize greater productivity from improved processing cycle times, such as injection molding cycles, because resin with lower starting IV may require less energy for melting and may more quickly fill molds and/or be transformed into the liquid state with less shear stress relative to the shear stress that a higher IV resin may be exposed to during processing. Processing may include other types of processes with or without melting whereby the polyester resin is formed into a different shape including, for example, compression molding, stretch blow molding, thermoforming, and reaction injection molding.

Conventionally, a resin preform is transformed to a bottle or a container by blow-molding. The blow molding is carried out at a temperature above the glass transition temperature of the polyester, for example 90-110° C. which is substantially lower than the injection molding temperatures to which the pellets and/or chips are exposed during injection molding to form the pre-form. Pre-heating a preform is often carried out by infrared heating. During blow molding the IV of the resin may not change substantially, and preferably does not change at all.

SUMMARY OF THE INVENTION

Accordingly, one object of the invention is to provide a method for processing a polyester resin without reducing the IV of the resin by more than 0.025 dL/g.

Another object of the invention is to provide a method of processing polyester resin with less degradation than conventional processing.

Another object of the invention is to provide a method for producing a carbonated soft drink bottle that includes forming a preform from a solid polyester resin and then forming the carbonated soft drink bottle from the preform without reducing the IV of the polyester resin by more than 0.025 dL/g.

Another object of the invention is to provide a processing method for forming solid articles from a polyester resin using less energy and having a faster cycle time.

Another object of the invention is to provide a method for processing a polyester resin which permits an increased amount of polyester regrind to be present in the polyester resin without substantially affecting the properties of the molded article prepared therefrom in comparison to a molded article prepared from virgin polyester resin.

Another object of the invention is to provide a molded article that is prepared by a process wherein a polyester resin is processed without a loss of more than 0.025 dL/g.

Another object of the invention is to provide a polyester resin having improved gas barrier resistance that is made by a process without solid-state polymerization, and that is capable of undergoing processing with a lesser degree of IV reduction at a higher amount of gas barrier additive.

It is still a further object of the invention to provide a polyester resin that is capable of being subjected to melting and processing including solidification without a significant change in intrinsic viscosity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a process for producing polyester resins including melt-phase polycondensation and solid state polymerization;

FIG. 2 shows a process for producing polyester resins without solid-state polymerization;

FIG. 3 shows a intrinsic viscosity gradient comparison of a CSD/Beer resin made with and without solid-state polymerization;

DETAILED DESCRIPTION OF THE PREFERRED EMBODIMENTS

Figure 4:
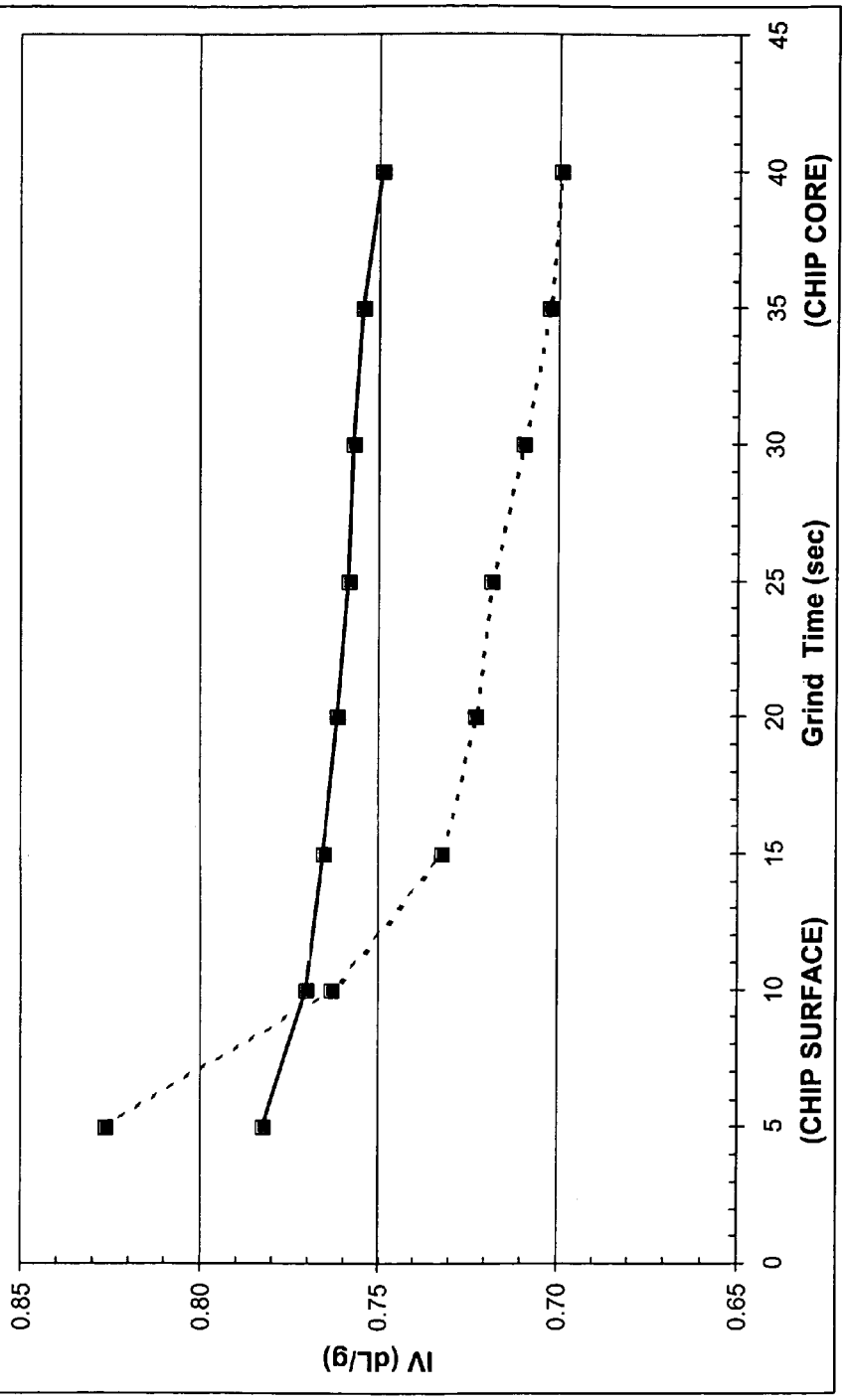
FIG. 4 shows a comparison of the IV gradient in a water bottle resin made with and without solid-state polymerization.

One aspect of the invention is a method that includes processing a resin, e.g., by melting the resin, forming a shaped article from the molten resin, and cooling the shaped article to form a solid shaped article, without changing the intrinsic viscosity (IV) of the polyester resin by more than 0.025 dL/g. Processing includes any method by which the polyester resin is transformed from a solid form to a flowable and/or plastic form. The transforming may include heating the polyester resin beyond the glass transition temperature then forming a shaped solid article from the heated polyester resin. Processing further includes any method by which a solid polyester resin is heated above its glass transition temperature and/or melt temperature and is subsequently and/or concurrently formed into a shaped article including: injection molding, reaction injection molding (RIM), stretch blow molding, injection blow molding, recycling, extrusion molding, compression molding, thermoforming, and such methods for processing polyester resins as described in "PET Packaging Technology," by David W. Brooks and Geoff Giles (2002), the portions of which describe processing methods for polyester resins and/or PET resins are incorporated herein by reference. Preferred processing includes injection (blow) molding, sheet and film extrusion, and compression molding.

The measurement method for determining solution intrinsic viscosity (IV) of polyester (e.g., PET) resins is conventionally known. Solution IV can be measured at 0.50% concentration of the resin in a 60/40 (wt. %/wt. %) phenol/1,1,2,2-tetrachloroethane solution by means of a glass capillary viscometer. Conditions for measuring solution IV are described in ASTM D 4603-03 (approved on Mar. 10, 2003 and published in April 2003, incorporated herein by reference in its entirety). The solution IV of the co-barrier resins described herein can also be measured the same method used to determine solution IV for polyester resins.

The glass transition temperature of the polyester resin processed in the invention is not restricted and may be defined or influenced by the degree of polymerization and/or comonomer content of the polyester resin (e.g., the number of polymerized monomer units making up the polymer chain) and/or the molecular weight distribution of a mixture of different polymers of different polymerization degree (polydispersity) and/or the identity and quantity of the monomer or co-monomer units of the polyester resin. Preferably a polyester resin having a narrower molecular weight distribution is used because it may show less degradation and a more stable IV upon processing than a polyester resin having a broad molecular weight distribution.

The glass transition temperature (Tg) of the resin is preferably from 75 to 90° C., more preferably from 80 to 85° C. and most preferably about 82° C. The Tg of resin compositions containing additives may have glass transition temperatures higher or lower than those mentioned above by as much as 5° C.

In a preferred embodiment, the resin is in the form of a solid particle and has a uniform IV distribution across all dimensions of the particles. Conventional resins in the form of solid particles made with solid state polymerization may have an intrinsic viscosity gradient when in the form of a chip or pellet. A chip or pellet having an IV gradient may have an IV that varies across the dimension of the pellet and/or chip. For example, a particular pellet of polyester resin may have an IV of 0.9 when measured at the exterior of a pellet or chip and an IV that is different from the IV measured at the interior of the pellet and/or chip (e.g., there may be an IV gradient of as much as 0.2-0.3 IV dL/g across the dimension of the chip and/or pellet). Such an IV gradient normally does not affect the overall or average IV of the polyester resin when measured in the bulk. However it may introduce variability into the IV determination of small samples of the polyester resin if there is an insufficient amount of polyester resin in the sample and thus the sample does not provide a representative cross-section of materials present in the polyester pellets and/or chips.

The existence of the IV gradient in the conventional solid form resin may be due to the solid-state polymerization during which the resin particles are heated in the solid form and ethylene glycol may be formed and released (e.g., as the resin undergoes further condensation and chain lengthening). If the ethylene glycol is slow to diffuse out of the resin its presence may slow the chain lengthening reaction.

It is thought that during solid state polymerization the exterior of the resin particle is subjected to a longer heat history because it is the first portion of the solid form resin to be heated in the solid-state polymerization process. Ethylene glycol formed by the polymerization is more likely to escape from the periphery of the resin particle (e.g., pellet or chip) due to a tendency to more easily diffuse out of the particle in comparison to ethylene glycol present in the center of the resin particle.

In contrast with conventional resins, the resin used in the process of the invention is not subjected to solid-state polymerization and has no or substantially no IV gradient in the resin particle or substantially less intrinsic viscosity variation (e.g., gradient) across the resin particle. The IV of the resin of the invention may, in one aspect of the invention, vary by no more than 0.05, preferably no more than 0.03, preferably no more than 0.025, more preferably no more than 0.02, even more preferably no more than 0.015, further preferably no more than 0.01 and most preferably the IV will be the same across any dimension of the resin particle. FIG. 4 provides a comparison of the IV variation in a solid form conventional CSD/Beer grade resin in comparison to a corresponding resin according to the invention (i.e., a resin which is not subjected to solid-state polymerization). FIG. 3 shows the IV of the exterior of resin particles relative to the IV measured for the resin at the interior of the resin particle (e.g., pellet core). The IV measurements represent the IV measured from samples obtained by grinding resin particles for consecutively longer periods of time. The grinding is carried out by cryo-grinding with a 1 mm slit bowl, collecting samples every 5 seconds. As the solid form resin is initially subjected to grinding, only small chips and/or powder is removed from the exterior of the pellet. Thus the IV measured for the powder and/or small chips obtained by grinding for a short period of time is representative of the exterior of the solid form resin. The IV is measured for this powder and/or chip to provide the data used to prepare FIG.

3. Similar results are seen for a resin for use in manufacturing water bottles (see FIG. 4).

FIGS. 3 and 4 demonstrate that the resin that may be used in the process of the invention has a lesser IV gradient in comparison to conventional resins.

In a preferred embodiment of the invention, the processing of the invention includes heating the polyester resin above its melting temperature. Further preferably, the polyester resin is heated to the point where it is a free-flowing liquid. In a further preferable embodiment of the invention, the polyester resin is subjected to high shear stress while heating. High shear stress conditions are those conditions which may be observed or created in processes such as conventional injection molding and/or extrusion which result in melting and mixing of the polyester resin during processing.

The processing may be carried out on a polyester resin that is dried or undried. A dried polyester resin is a crystallized resin that has been heated in its solid state to a temperature above the glass transition temperature in a dehumidifying environment. A dried polyester resin contains less than 1,000 ppm, preferably less than 500 ppm, more preferably less than 50 ppm, especially preferably less than 25 ppm of water based upon the weight of the water relative to the total weight of the resin. Drying may also be accomplished by exposing the polyester resin to a dehumidified atmosphere to thereby remove water adsorbed or absorbed by the polyester resin.

Undried polyester resin may be a polyester resin that contains water or a resin that is free of water. A resin that is free of water may be one that is obtained by solidifying a polyester resin liquid obtained directly from a polyester polymerization process in an atmosphere that is substantially free of water (e.g., substantially free of water includes atmospheres that have 99%, preferably 99.5%, more preferably 99.9% by volume free of water vapor). Thus, an undried polyester resin may be one that has not undergone heating in the solid state.

An undried polyester resin may be one that is obtained in the solid form from a polyester polymerization process then stored in an atmosphere that is not inert and/or not dried (e.g., dehumidified). Water vapor present in the atmosphere may absorb onto the surface of the polyester resin and/or may absorb into the matrix of the polyester resin. An amount of water of as much as 5% by weight based upon the weight of the water relative to the total weight of the resin may be present. Preferably, the polyester resin used in the method of the invention is an undried water-free resin or a dried resin.

In another embodiment of the invention, the resin that undergoes the melting and processing of the invention may be a resin that has not been dried or has been dried to a lesser extent than conventional resins (e.g., resins prepared with solid-state polymerization). Because the resin described herein may be processed with less change in intrinsic viscosity, e.g., caused by melting and processing the resin, the resin may contain a relatively greater amount of water and still provide a processed resin that has a reduction in IV that is no greater than the IV reduction observed when processing conventional resins. Thus the resin of the invention does not need to be dried completely (e.g., in comparison to the drying needed in a conventional resin) but is still able to provide a shaped article having an IV change equivalent to or less than the viscosity change (e.g., reduction in intrinsic viscosity) for a conventional resin undergoing the same melting and processing.

In a preferred embodiment, the solid form polyester resin is dried before processing. The drying may be carried out in a conventional drier by passing dehumidified air over chips and/or pellets of the solid form polyester resin. Preferably the polyester resin is dried in a dehumidified environment for 2 to 10 hours, more preferably 4 to 8 hours and most preferably about 6 hours. The dehumidified gas passing over the polyester pellets and/or chips has a dew point of less than $-10°$ C., preferably less than $-20°$ C., more preferably less than $-40°$ C., even more preferably less than $-50°$ C., most preferably less than $-60°$ C. The dehumidified gas passing over the polyester pellets has a temperature in the range 220 to 400° F., preferably 260 to 360° F., more preferably 300 to 320° F.

By subjecting the resin to less drying or drying the resin under conditions that do not require the temperatures and/or dew points necessary to achieve sufficient drying in conventional resins, significant savings in utility and equipment costs may be realized. Thus, in one embodiment of the invention a solid form resin may be subjected to melting and processing without drying or with partial drying, yet still form a shaped article exhibiting an IV change after melting and processing that no more than or less than the IV change observed under the same conditions with a corresponding conventional resin (e.g., a polyester resin made with a process including solid-state polymerization). Reduced drying requirements permit the design of manufacturing facilities (including new plant construction) with less capital investment dedicated to drying facilities and ancillary infrastructure.

The polyester resin of the method of the invention may be any polyester resin including a conventional polyester resin. Conventional polyester resins may be prepared by reacting monomer units of a diol and a carboxylic acid (or an ester of a carboxylic acid). In order to obtain a sufficient IV, conventional polyester resins may be subjected to a solid-state polymerization. However, some polyester resins may be made without solid-state polymerization. In a polyester resin made without solid state polymerization, the resin produced by the polymerization reaction of one or more diol units and one or more carboxylic acid/ester units may be used to form preforms directly from the molten polyester resin without undergoing any intermediate solidification or it may be solidified into chips and remelted in order to mold preforms or other objects.

Examples of preferred polyester resins made without solid-state polymerization include those resins described in U.S. application Ser. No. 11/294,370, incorporated by reference in its entirety.

In one preferred embodiment, the resin used in the method of the invention is a resin that is prepared without solid-state polymerization. A resin prepared without solid-state polymerization may include a resin that is made to its final intrinsic viscosity (e.g., that viscosity which is measured on the pellets or the commercially transported form) without any solid state polymerization (e.g., heating of the resin in the solid state at a temperature and for a period of time sufficient for increasing the IV by more than 0.05 dL/g). For example, the resin of the invention is made without solid-state polymerization and has an IV achieved substantially by polymerizing the monomer units in the molten phase. Optionally, the solid form resin thus obtained is not subsequently heated to a temperature at which a further or finishing polymerization may be achieved.

In other embodiments, the resin used in the method of the invention may have a minor degree of polymerization that is at least partially achieved by heating the resin in the solid form after it is made by melt polymerization and isolated in the solid phase. For example, in one embodiment, a resin used in the method of the invention may have an IV of 0.7 and may be derived from a resin having an IV of 0.68 achieved by carrying out polymerization without conventional solid-state polymerization. However, subsequent handling or heating of resin in the solid form, either through a conventional solid-state polymerization or through other means such as drying at elevated temperature may increase the intrinsic viscosity by an amount of, for example, 0.02 dL/g. Thus, the resin, having a final IV of 0.70, is produced by first forming a resin having an IV of 0.68 without solid state polymerization then increasing the IV of the resin by a minor amount (e.g., 0.02 dL/g) to thus prepare a resin having a final IV of 0.70. Preferably, the IV of the resin used in the process of the invention is increased by no more than 0.05, preferably 0.04, more preferably, 0.03, even more preferably 0.02, especially preferably 0.01 and most preferably 0 dL/g after the resin is initially isolated from melt polymerization.

The term without solid state polymerization, as used herein, includes resins that are made by melt polymerization to a first IV then further polymerized in the solid state to a second IV that is no greater than 0.05 dL/g greater than the first IV.

The IV of the polyester resin that may be used in the method of the invention may fall within a wide range. For example, for carbonated soft drink containers, the IV of the polyester resin may be from 0.6 to 1.0 dL/g, preferably from 0.7 to 0.9, more preferably from 0.75 to 0.85, even more preferably from 0.77 to 0.83, especially preferably about 0.8. In one embodiment of the method of the invention, the IV of the polyester resin changes by no more than 0.025 dL/g after undergoing processing to form a solid article (e.g., by first melting then solidifying). Preferably, the change in IV is no more than 0.025, more preferably no more than 0.02, even more preferably no more than 0.015, most preferably the change in IV is no more than 0.01, and especially preferably there is no measurable change in the IV.

In one embodiment of the invention, the polyester resin is in the form of a solid (e.g., a solid-form polyester resin) which is processed by melting, forming a shaped article, then solidifying to produce a shaped article. The initial solid-form polyester resin may be in the form of chips or pellets. The solid-form polyester resin may contain an amount of regrind or recycled polyester of from 0 to 20% by weight based upon the total weight of the polyester resin, preferably the recycled or regrind material is present in an amount of no more than 15% by weight, more preferably no more than 10% by weight, even more preferably no more than 5% by weight, in a most preferred embodiment the solid-form polyester resin is a virgin resin containing no regrind or recycled polyester material and is in the form of distinct solid particles (e.g., pellets and/or chips).

During the manufacture of articles such as bottles, containers, and the like, many individual articles and parts are made that are not of first quality or are otherwise not marketable. It is desirable to reuse (e.g., recycle) the resin in such "off-grade" articles. The resin from which off-grade materials are made may be mixed with virgin PET resin to recover to form other articles.

In one embodiment, these articles are ground, chipped or otherwise reduced into smaller parts (e.g., particles) for the purpose of preparing the resin for reuse. The particulate form material thereby obtained is commonly known as "regrind." The regrind may be introduced into the virgin resin stream. The amount of regrind that may be present in the resin used to manufacture articles such as performs for blow molding bottles and/or containers may vary over a wide range depending on availability of the resin, the end purpose of the formed article, and other various factors. Regrind may constitute from 0 to 100% of the resin used to form a processed (e.g., injection molded) article such as a preform that may be used to blow mold a container. For example, thermoforming may include regrind in an amount of from about 40 to 100%, custom containers include regrind from about 0 to 30%, and CSD/Beer containers include regrind from about 0 to 15%, where % is % by weight based on the amount of regrind and the total weight of the resin. Amounts of regrind that vary from the above amounts may be present including any range or sub-range of the ranges above including any increment of 1, 2, 3, 5, and 10%.

Figure 5A:
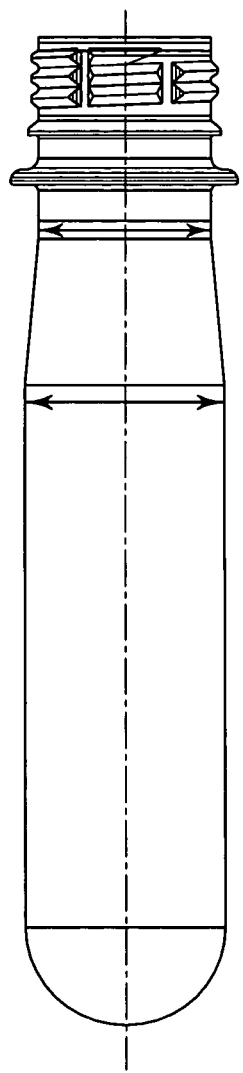
FIG. 5 shows a bottle preform that may be a shaped article formed in one embodiment of the invention method.
Figure 5B:
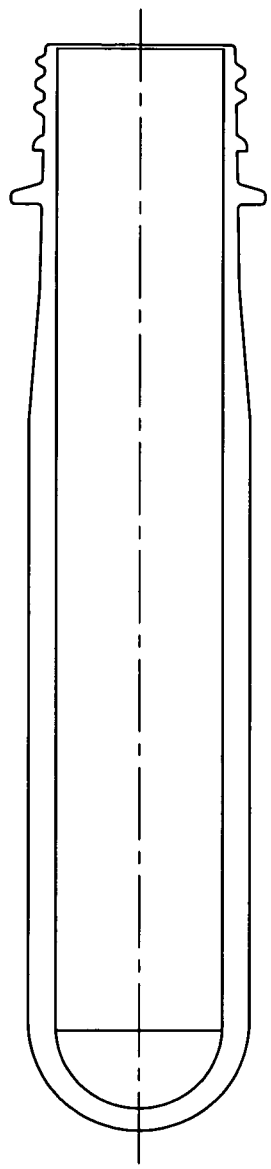

In a preferred embodiment of the invention, the solid shaped article formed from the polyester resin is a bottle preform. An example of a bottle preform is shown as FIG. 5.

Typically, the bottle preform consists of the polyester resin but in other embodiments the bottle preform may include additives or may be a mixture of the polyester with one or more other resins. Preferably, the bottle preform is fabricated from the polyester resin by injection molding. The bottle preform may be of any size including the range of from 12 or less grams to 300 or more grams for each preform. For example, preforms from which single serve water bottles are blow molded may weigh from 12 grams or less to as high as 40 grams or more. Some preforms that are designed for CSD/Beer applications can be as low as 20 grams or less and as high as 65 grams or more. Other preform designs which may be used in the custom container markets can be as low as 12 grams or less or as high as 100 grams or more and some preforms designed for use in the bottled water market can be as low as 50 grams or less or as high as 300 grams or more. Preferably, the bottle preform is fabricated from the polyester resin by injection molding, however, other means of fabricating the preform are available, for example, compression molding. The bottle preform is cooled after injection molding and may be stored for 6 months or less to 12 months or more depending on storage conditions.

Preferably the injection molding carried out to form the bottle preform utilizes a multi-cavity mold. For example, an injection molding apparatus having multiple cavities is preferably used. Each cavity of the multi-cavity mold is capable of forming a single bottle preform.

The elimination and/or reduction of change in the IV of the polyester resin may be especially pronounced in injection molding processes which utilize a mold having a high number of cavities. In such injection molding processes, a greater amount of the molten polyester resin must be pressurized into the multi-cavity mold in comparison to a mold having fewer cavities because a greater volume of polyester resin must be used to form a greater number of bottle preforms. Thus, in one embodiment of the invention, an amount of molten polyester resin may be held at a temperature above the melting temperature of the polyester resin for a longer period of time at a higher temperature in comparison to conventional polyester resins and/or molding processes utilizing conventional polyester resins. In the method of the invention, a lower degree of IV reduction is observed in the resin after the melting and extended heat history in comparison to conventional polyester resins and/or molding operations.

The injection molding of the polyester resin to form a bottle preform may be carried out under different conditions. Preferably the injection molding is carried out with an injection molding apparatus that is capable of completely melting the polyester resin and having sufficient injection pressure to fill a multi-cavity mold. The extruder portion of such an injection molding apparatus may contain a plurality of heating zones. The temperature of each heating zone is independently controlled. The number of heating zones is not limited, preferably, the number of heating zones is 4 or more, more preferably 5 or more, more preferably 6 or more, more preferably 7 or more, more preferably 8 or more, even more preferably 9 or more, most preferably 10 or more. Each heating zone is capable of heating the polyester resin to a temperature above the melting temperature of the polyester resin. The temperature of any zone may vary from, for example, 450 to 650° F., preferably from 475 to 525° F., more preferably from 500 to 575° F., most preferably about 550° F. Any of the aforementioned temperatures may be varied by any increment of, for example, 2, 4, 6, 8 or 10° F., or any multiple thereof.

The screw speed of an injection molding apparatus used to carry out the injection molding may be varied as needed to adjust cycle time and other factors of the injection molding process. For example, the screw speed may be from 20 to 200 rpm, preferably from 30 to 160 rpm, more preferably from 40 to 120 rpm, more preferably from 50 to 80 rpm, more preferably about 60 rpm. The screw speed may be varied in any increment of 1, 2, 4, 6, 8 and 10 rpm within any of the aforementioned ranges, or any multiple thereof.

The back pressure of the injection molding process may be varied and may range from 0 to 700 psig, preferably from 300 to 350 psi, more preferably from 250 to 400 psi, and especially preferably from 200 to 600 psi. The cycle time is preferably less than one minute, more preferably less than 45 seconds, and most preferably less than 30 seconds. The cycle time is the total time from clamp open to clamp open. The cycle time is usually defined by the following functions; mold fill, part cooling, mold open, part ejection, part removal, mold close. Simultaneously and within the same amount of time, resin is being melted into a liquefied state, the resin is undergoing conditioning (e.g. extrusion), and the molten resin (e.g., polymer melt) is in preparation for transfer into the mold space. One method includes feeding the resin into an extruder for melting and mixing within a heated extruder with a revolving screw that compresses and conditions the polymer as it changes phase from a solid to a liquid, the liquefied resin is then transferred to a controlled volume which is transferred into a mold. Since these actions may dependently coincide, a correlation can be drawn between the time of the cycle, and the time that the polymer is in the liquid phase. This correlation may differ from bottle preform part to bottle preform part and from mold to mold and from machine to machine.

During injection molding to form a bottle preform or during blow molding of a shaped article of a bottle perform to form a shaped article such as a carbonated soft drink container, a certain degree of mold shrink may occur. Mold shrink is that amount of shrinkage associated with the shaped article after complete cooling and ejection from the mold. Mold shrinkage is a value comparing the dimensions of the cooled, finished shaped article with the dimensions values of the mold from which the shaped article was obtained. Mold shrink values are an important characteristic of shaped articles, both bottle preforms and blow-molded shaped articles, especially as it relates to the sealing, capping and leak characteristics of a sealed container prepared by injection molding a bottle preform and subsequently blow-molding the sealed container. If there is a substantial mold shrink, sealing between a cap and the |Liquid| held in the container may not be sufficient to prevent leaking and/or otherwise prevent a failure of the container seal.

In the method of the invention, the mold shrink value of the preform obtained by injection molding the resin of the invention preferably does not change by an amount greater than the mold shrink value associated with conventional polyester resin. Moreover, the mold shrink properties of the blow-molded article obtained from the bottle preform are essentially equivalent or exactly the same as the mold shrink value for a blow-molded article derived from a bottle preform made from a conventional polyester resin. Preferably, the mold shrinkage is the same as the mold shrinkage for corresponding conventional resins.

Figure 6:
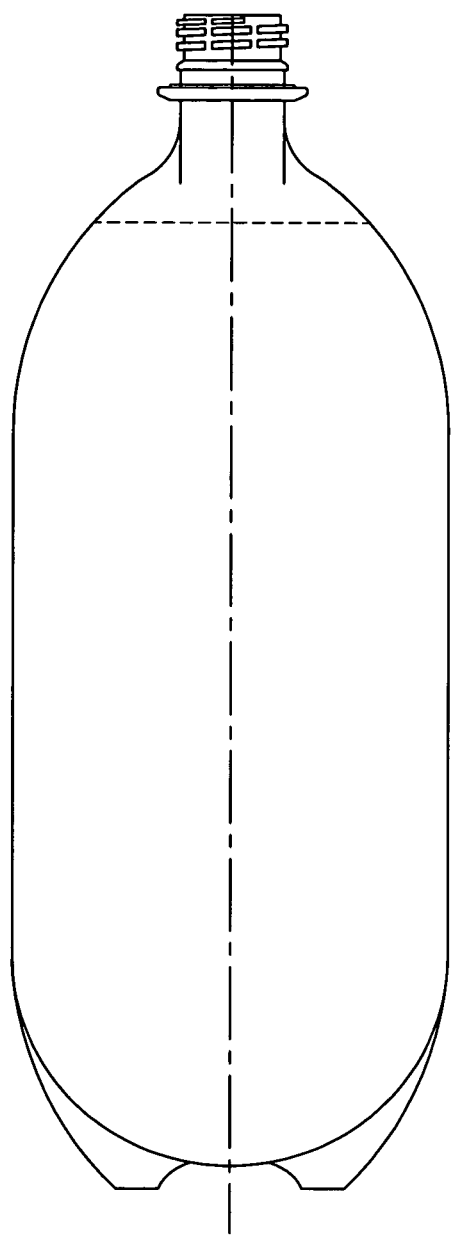
FIG. 6 shows a blow-molded article obtained from a shaped article obtained by one embodiment of the method of the invention.

The injection molded bottle preform may be used in a blow molding process to form an expanded bottle (e.g., a blow-molded bottle or container). An expanded bottle formed from a preform obtained from the method of one embodiment of the invention is shown as FIG. 6.

During blow molding the bottle preform is heated, for example by infrared light, and subsequently expanded under pressure by a gas or initiated by mechanical means. The polyester resin may undergo significant stretching during blow-molding. For example, an axial stretch ratio in a blow-molded bottle obtained from a preform may be from 1.5 to 3.5 times, preferably from 1.75 to 3.25 times, more preferably from 2 to 3 times, even more preferably from 2.25 to 2.7 times, most preferably about 2.5 times. The hoop stretch ratio of the blow-molded bottle may be, for example, from 3 to 7 times, preferably from 3.5 to 6.5 times, more preferably from 4 to 6 times, most preferably from about 4.5 to about 5.5 times, even more preferably about 5 times.

Typically, the bottle preform is blow molded into a straight wall mold. However, other molds such as shaped and/textured molds and of all sizes may be used without restriction. One bottle form is a two liter carbonated soft drink bottle.

Forming the expanded preform by blow molding may include heating the bottle preform with a plurality of lamps providing infrared heat to the bottle preform. The preform may be heated to a temperature of, for example, 80 to 150° C., preferably from 85 to 140° C., more preferably, from 90 to 130° C., even more preferably, from 95 to 120° C., most preferably about 100° C. Gas may be injected into the heated bottle preform to stretch the polyester resin at a stretching speed of from 0.2 to 2.0 meters/second, preferably from 0.4 to 1.5, more preferably from 0.6 to 1.2, most preferably about 0.8 m/s. The heated bottle preform may be inflated in the bottle mold with an initial pressure of about 20 bar, for example from 5 to 30 bar, more preferably from 8 to 22 bar. A final blow may be carried out with a gas pressure of 40 bar or greater. The final blow may be used to better define the shape and/or texture of the container. In one embodiment the temperature of the mold is cooler than the temperature of the polyester bottle preform and is preferably from 0 to 100° C., more preferably from 10 to 80° C., more preferably from 15 to 60° C., and most preferably from 20 to 50° C. In a heat set embodiment the temperature of the mold is as high as 200° C., preferably from 100 to 200° C., more preferably from 125 to 175° C., most preferably from 140 to 160° C.

The bottle, e.g., a carbonated soft drink or beer bottle, formed from the polyester bottle preform is preferably free of haze and pearlescence. The temperature of the bottle preform during blow molding may be adjusted so that pearlescence is not observed in the blow molded article obtained from the bottle preform. A bottle preform temperature that is too low during blow molding may result in unacceptable pearlescence whereas a temperature that is too high may result in haze.

The gas barrier resistance of the polyester resins used to manufacture polyester-based bottles by, e.g., blow molding, may be improved by 100% or greater if the polyester resin is oriented. For carbon dioxide gas and oxygen gas, an oriented polyester bottle has a gas barrier resistance of at least two times (2×) as great as or more than an unoriented polyester bottle. The process of biaxial orientation provides for generation of stress-induced lamellar crystals. The oriented crystallites result in lower gas permeability and enhanced mechanical properties. A biaxially-oriented polyester bottle typically has a crystallinity of 20-30% (21% in the shoulder, 25% in middle panel, 25% in the foot), which is based on the densities as measured in a density gradient column. Alternatively, a polyester resin may be modified with a co-barrier resin that is known to have greater gas barrier resistance than PET. For example, meta-xylene diamine (MXDA)-based polymers such as MXD6, MXD6-IPA, MXD6-phthalic anhydride etc. may have better gas barrier properties than PET. Such MXDA-containing polymers may also have better gas resistance than certain nylons such as nylon 6, nylon 6/6 etc. MXD6 is a semi-crystalline polyamide resin that may be produced by the polycondensation of MXDA with adipic acid. Processes for producing such MXDA-containing polymers are described, for example, in U.S. Pat. Nos. 4,433,136 and 4,438,257 each of which is incorporated herein by reference in its entirety.

In another aspect of the invention, the polyester resin obtained without solid-state polymerization is made by processing directly from a finisher (e.g., a wiped- or thin-film evaporator), through a die and subsequently pelletizing with or without water cooling.

In one embodiment, the resulting resin is extruded in the form of strands that may be cut at temperatures higher than the glass transition temperature of the resin. Preferably the strands are cut at temperatures that are 10, 15, 20, 30, 40, 50 or 100° C. greater than the glass transition temperature of the resin concurrently or after the strands have passed through a water bath. The chips are preferably separated from the water as quickly as possible. The temperature at the exterior of the pellets may be lower than the temperature inside the pellets. The chips and/or pellets may continue to crystallize via their inside residual heat (e.g., latent heat crystallization). The polymer (e.g., resin) used in the invention may be latent heat crystallized or alternatively may be conventionally crystallized. Optionally, a chip vibrator or a fluidized bed may be used to prevent the chips from sticking together during heating and/or crystallization.

One way to reduce the tendency of chips to stick together is by imparting more rapid or more robust crystallinity to the chips and/or pellets formed during cooling and/or cutting. This may especially be the case if the resin contains more than one type of polymer.

Some polyester-containing resins such as resins that contain an MXDA co-resin may be more prone to sticking or clumping when heated (e.g., when heated above the glass transition temperature or close to the glass transition temperature). Preferably such resins and/or resin mixtures are not cooled below the Tg following extrusion (e.g., when forming strands) so that latent heat crystallization may take place. The pellets and/or chips thus formed are less prone to sticking, even if subjected to solid state polymerization. In a preferred embodiment of the invention, the resin that is processed in the invention process is a polyester resin that has undergone latent heat crystallization.

Resin compositions may also be cooled/crystallized in a manner that provides an amorphous chip and/or pellet. Cold cooling, with or without cutting, may provide chips and/or pellets that are amorphous.

As the melt-phase polymerization reaches a target IV, the molten polyester (e.g., PET, PEN, etc.) is pumped in the molten state through a die. The resin may be pelletized using any conventional method including any one of the methods described below. In conventional melt polycondensation processes for preparing polyester compositions such as PET compositions or PET-containing compositions, the molten polyester is completely quenched as clear/amorphous particles. In one embodiment of the invention, the resulting resin (e.g., after passage of the molten resin through a die) can be treated by any conventional method. For example, dry/cold pelletizing can be carried out whereby the clear/amorphous molten resin is rapidly quenched in a water bath. The water of the quenched resin is first blown away and then the resin is pelletized.

In another embodiment of the invention, wet/cold pelletizing may be used. A wet/cold pelletizing process may use a partially underwater pelletizer. The rapid quenching process may be carried out by continuously spraying molten falling strands of the resin with cold water. The wet/cold strands are then pelletized by a rotating cutter, which may be partially in the water. Underwater pelletization may also be used to form the pellets and/or chips of the resin. For example, conventional underwater pelletization of strands of resin may be used to form the pellets and/or chips of the resin. Underwater pelletization may take place with a die faced pelletizer. Preferably, an underwater die faced pelletizer is used to obtain a solid form of the resin that is latent heat crystallized.

In another embodiment of the invention, wet/hot pelletizing may be used. As molten resin exits from the holes of a die they may be immediately cut while hot. Hot cutting is preferably carried out above the glass transition temperature or the melt temperature of the resin and typically provides spheroidal and/or ellipsoidal particles.

In a preferred embodiment of the invention, the molten polyester composition is partially cooled to solidify the composition. The temperature to which the polyester compositions are partially cooled is between the glass transition temperature (Tg) and the melting point of the polyester resins. The polymer composition is then maintained at a temperature of 170±50° C., preferably ±40° C., and more preferably ±30° C., especially preferably ±20° C., for PET crystallization by separating the hot chips from the water as quickly as possible. Separation of the solidified polyester composition from, for example, a water bath, may be facilitated with a centrifugal drier, a vibrating plate and/or a vibrating screener, such as those available from Rieter, BKG and Gala Industries. The residual heat of the chips can be used for in-situ crystallization without a conventional crystallizer. Preferably, this aspect of the invention is carried out on a polyester resin.

The polyester resin may be made by a melt-phase reaction carried out in a plurality of reactors connected in series, in parallel, or in both series and parallel. The reaction of the dicarboxylic acid and diol monomers may be carried out in the absence of any solvent (e.g., a diluent component that does not form a substantial portion of the reacted polymer units in the resin composition). The monomer units are reacted to form a material having an intrinsic viscosity that may preferably range in one embodiment of the invention from 0.2 to 0.5 IV to the final finisher. The molten material thus formed in the melt-phase reactor is then pumped or transferred to a finishing reactor. The finishing reactor may be a reactor such as a wiped- or thin-film reactor which provides substantial contact between surface areas of the reactor and results in high mixing of the molten reacted melt-phase product. The finisher may be carried out in one or more reactors connected in series, parallel, or both in series and parallel. In addition to the wiped-film reactor, one or more pipe reactors may be included. The resin product obtained from the last finishing reactor may have an intrinsic viscosity of from 0.7 to 0.9, preferably about 0.75 to 0.85, more preferably around 0.80, for example for a CSD/Beer resin The molten resin product obtained from the finishing reactor is then preferably subjected to a polymer filtration in the molten form. Polymer filtration may be carried out in one or more steps.

For example, after the resin material from the last finishing reactor is filtered, one or more co-barrier resins may be mixed with the molten, filtered polyester resin composition. In one embodiment of the invention, a co-barrier resin is melt extruded and then mixed with the molten polyester resin composition that is filtered and in molten form. The mixed streams obtained from the melted co-barrier resin and the filtered polyester resin composition may be directed to a static mixer for mixing. After mixing, preferably continuous mixing, the molten, mixed material is directed to a pelletizer to solidify the mixed polyester resin composition. For example, the mixed polyester resin composition may be pumped through a die containing a series of orifices. The molten material exiting the orifices is pelletized. As the resin enters the water of the underwater pelletizer, it slowly solidifies. The water of the underwater pelletizer may be maintained at a high temperature. Preferably, the water of the underwater pelletizer is maintained at a temperature of above 50° C., preferably above 80° C., even more preferably above 90° C. Preferably, the hot water of the underwater pelletizer is maintained at a temperature that is above the glass transition temperature of the polyester resin composition and below the melting point of the polyester resin composition. In another embodiment of the invention, to avoid latent heat crystallization, the water temperature is preferably below 80° C., preferably below 60° C., more preferably below 50° C.

By carrying out solidification of the molten, mixed polyester resin composition with hot water and cutting, the process of one embodiment of the invention provides pellets and/or chips of solid polyester resin composition that is in the crystalline phase. Because the pellets and/or chips are in the crystalline phase, they may appear opaque.

The resulting solid, opaque, crystalline polyester resin composition may then be transferred to a product silo for intermediate storage or for packaging. The thus obtained product may be mixed with co-barrier resin in solid form, for example as a pellet or powder, to form a mixture of pellets and/or chips of the invention polyester resin composition and a solid form co-barrier resin. The resulting composition may then be used for injection molding operations, including the formation of pre-forms for blow molding articles such as containers and bottles.

One embodiment of the invention includes a polyester resin obtained by reacting monomer units of a diol and a dicarboxylic acid to form a polyester having the reacted monomer units present in an equimolar or nearly equimolar quantity. In a preferred embodiment the diol and the dicarboxylic acid are reacted to form a polymer having the monomer units present in approximately equimolar quantities. The diol and the dicarboxylic acid may be reacted in amounts that are not exactly equimolar in quantity. For example, the diol may be present in greater quantities than the dicarboxylic acid. During the polycondensation reaction, the excess diol is typically removed with heat at reduced pressure. Suitable polyesters useful in the compositions of the invention are well known in the art and are generally formed from repeat units comprising one or more carboxylic acid components selected from terephthalic acid (TPA), isophthalic acid, naphthalenedicarboxylic acid, dimethyl-2, 6-naphthalenedicarboxylate (NDC), hydrolyzed 2,6-naphthalenedicarboxylic acid (HNDA), and one or more diol components selected from ethylene glycol, diethylene glycol, 1,4-cyclohexane-dimethanol, 1,3-propanediol, 1,4-butanediol, propylene glycol (1,2-propanediol), 2-methyl-1,3-propanediol, and 2,2-dimethyl-1,3-propanediol (neopentyl glycol) and mixtures thereof. Preferred polyesters of the present invention include poly(ethylene terephthalate) (PET), poly(ethylene naphthalate) (PEN), poly(ethylene isophthalate) (PEI), and poly(trimethylene terephthalate) (PTT), poly(trimethylene naphthalate) (PTN), most preferably poly(ethylene terephthalate) (PET).

The polyesters of one aspect of the invention can be made using processes well known to skilled artisans. Suitable polyesters can be produced in a conventional manner by the reaction of a dicarboxylic acid having 2 to 40 carbon atoms with one or more polyhydric alcohols such as glycols, diols or polyols, containing from 2 to about 20 carbon atoms, preferably from 6 to 12 carbon atoms. The general conditions producing polyesters, including process conditions, catalysts, and additives are known to skilled artisans. Methods of producing polyester materials and combinations of polyesters with other polymeric materials are given in W. R. Sorenson and T. W. Campbell, "Preparative Methods of Polymer Chemistry," (Interscience Publishers, New York 1968, and subsequent editions) and the "Encyclopedia of Polymer Science; and Engineering, 2nd Ed.," H. F. Mark et al., (John Wiley & Sons, New York 1985), particularly Volume 12, pages 1-290 (polyesters generally) and especially pages 259-274 for resin manufacturing processes, each of which is incorporated herein by reference.

The dicarboxylic acid that may be used to make the invention polyester-containing compositions includes alkyl dicarboxylic acids having 2 to 20 carbon atoms preferably from 6 to 12 carbon atoms, and an aryl- or alkyl-substituted aryl dicarboxylic acids containing from 8 to 24 carbon atoms, preferably from 8 to 16 carbon atoms. Additionally, alkyl dicarboxylic acid diesters having from 4 to 20 carbon atoms or alkyl-substituted aryl dicarboxylic acid diesters having from 10 to 20 carbon atoms can be utilized.

The dicarboxylic acid component of the invention polyester may optionally be modified with up to about 30 mole percent, preferably up to about 25 mol percent, more preferably about 20 mol percent of one or more different dicarboxylic acids. In another embodiment of the invention the polyester is modified with less than 10 mol %, preferably less than 8 mol %, most preferably from 3 to 6 mol % of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid in the invention resin composition in major or minor proportions include: phthalic acid, isophthalic acid, 5-(sodiosulfo)-isophthalic acid (5-Na$^+$SO$_3^-$-IPA), 5-(lithiosulfo)-isophthalic acid (5-Li$^+$SO$_3^-$-IPA), naphthalene-2,6-dicarboxylic acid (and also the 1,4-, 1,5-, 2,7-, and 1,2-, 1,3-, 1,6-, 1,7-, 1,8-, 2,3-, 2,4-, 2,5-, 2,8-isomers), cyclohexanedicarboxylic acid, cyclohexanediacetic acid, diphenyl-4,4'-dicarboxylic acid, succinic acid, glutaric acid, adipic acid, azelaic acid, sebacic acid, bibenzoic, hexahydrophthalic, bis-p-carboxy-phenoxyethane, and mixtures thereof and the like. Preferred dicarboxylic acids include isophthalic, terephthalic, and naphthalenedicarboxylic acids.

In a preferred embodiment of the invention the polyester matrix resin comprises from 5 to 30 mol % of isophthalic acid and from 1 to 15 mol % of a naphthalene dicarboxylic acid, more preferably from 2 to 10 mol % of the naphthalene dicarboxylic acid, even more preferably from 3 to 6 mol % of the naphthalene dicarboxylic acid, in the form of reacted monomer units.

Terephthalate polyesters for clear container applications are typically made from either a terephthalic acid and ethylene glycol, or from a terephthalic acid and a 1,4-cyclohexane diol. Suitable dicarboxylic acids include terephthalic acid, isophthalic acid, malonic, succinic, glutaric, adipic, suberic, sebacic, maleic and fumaric acid, all of which are well known dicarboxylic acids, or mixtures of these such that a copolyester is produced.

Polyhydric glycols or diols containing from 2 to 8 carbon atoms are preferred, most preferably ethylene glycol. Glycol ethers or diol ethers having from 4 to 12 carbon atoms may be substituted for the glycol or diol. Suitable glycols, in addition to ethylene glycol and 1,4-cyclohexanedimethanol (CHDM), include diethylene glycol, propylene glycol (1,2-propane diol), 1,3-propanediol, 2-methyl-1,3-propanediol, 2,2-dimethyl-1,3-propanediol (neopentyl glycol), 1,2-butanediol, 1,4-butanediol, pentaerythritol, similar glycols and diols, and mixtures thereof. These compounds and the processes for making polyesters and copolyesters using the compounds are all well known in the art.

In addition, the glycol component may optionally be modified with up to about 15 mole percent, preferably up to about 10 mol percent, more preferably about 5 mol percent of one or more different diols other than ethylene glycol. Such additional diols include cycloaliphatic diols preferably having 6 to 20 carbon atoms or aliphatic diols preferably having 3 to 20 carbon atoms. Examples of such diols include: diethylene glycol, triethylene glycol, propylene glycol, 1,4-cyclohexanedimethanol, propane-1,3-diol, butane-1,4-diol, pentane-1,5-diol, hexane-1,6-diol, hexane-1,4-diol, 1,4-cyclohexanedimethanol, 3-methylpentanediol-(2,4), 2-methylpentanediol-(1,4), 2,2,4-trimethylpentanediol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1, 3,3-tetra-methyl-cyclobutane, 2,2-bis-(3-hydroxyethoxyphenyl)-propane, neopentyl glycol, 2,2-bis-(4-hydroxypropoxyphenyl)-propane, mixtures thereof and the like. Polyesters may be prepared from two or more of the above diols.

The polyester may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The polyester resins described herein may contain one or more other elements or components conventionally used in the manufacture of polyester resins. For example, a typical resin may contain elements such as Co, Ti, Sb and/or P that may be present in the resin compositions due to their use and/or presence in the catalysts, heat stabilizers, and colorants used during the polymerization and/or processing of polyester resins. For example, Sb, Ge, Ti, or Sn may be used for the melt polymerization, for example, in the form of organic titanates, dibutyl tin dilaurate, tin organics, germanium dioxide, antimony trioxide ($Sb_2O_3$), antimony triacetate, and/or antimony glycolate ($Sb_2(gly)_3$) or oxides of the respective metals (e.g., $TiO_2$, $GeO_2$ etc.). Phosphorous may be present as a residue from any trialkyl phosphate or phosphite present during the polymerization and/or processing of the resulting resins. Elements that are present as residues from coloring agents used, for example, to modify and/or control yellowness index such as $Co(OAc)_2$ may also be present. Typically the materials that are present as residues from polymerization catalysts or processing additives are present in an amount of 1-1,000 ppm, preferably 5-500 ppm.

Also, although not required, other additives normally used in polyesters and/or other thermal plastic compositions, may be present in the invention resin composition. Such additives may include, but are not limited to, colorants, toners, pigments, carbon black, glass fibers, fillers, impact modifiers, antioxidants, stabilizers, flame retardants, reheat aides, acetaldehyde-reducing compounds, oxygen scavengers, barrier enhancing aides and mixtures thereof. Antiblock agents may also be present together with other lubricants.

The process of forming the polymeric compositions of the invention in a manner that excludes solid state polymerization includes the methods described in U.S. Published Application Nos. 2005/0029712 and 2005/0161863; and U.S. Pat. Nos. 5,980,797; 5,968,429; 5,945,460; and 5,656,719 (each of which is incorporated herein by reference in its entirety). In some of the embodiments described herein that include polyester compositions that are defined by their physical and chemical properties such as intrinsic viscosity, crystallinity, clarity, etc., conventional processes such as the process described in FIG. 1 may be used to form the polyester or co-polyamide.

The molten polymeric material may be mixed with one or more other molten polymeric streams containing polymeric polyester materials made from the same monomer units or different monomer units to form a mixture of molten polymeric material (e.g., a blend of polyester materials). In a preferred embodiment the resulting polymer composition is mixed with one or more additives while molten and then used in the formation of preform articles.

The intrinsic viscosity of the matrix resin (e.g., the polyester matrix resin) may be lower in the preform than the intrinsic viscosity of the resin from which the preform is molded. This may occur for a number of reasons. For example, the addition of a co-barrier resin having a different intrinsic viscosity may affect, e.g., raise or lower, the intrinsic viscosity of the final composition which may be a mixture of the matrix resin and the co-barrier resin. Further, after a step of processing to prepare a pre-form, it is possible that the heat history thereby incurred may result in a decomposition or depolymerization of the matrix resin thereby lowering the intrinsic viscosity.

For the polyester matrix resin the polymerization of the monomer units is preferably carried out to provide a target intrinsic viscosity of from 0.7 to 0.95, preferably from 0.75 to 0.85, most preferably the intrinsic viscosity is about 0.80 dL/g, e.g., for CSD/Beer, or 0.72, e.g., for water bottle.

The concentration of acetaldehyde in polyester resins is an important property of the resins and may determine whether a particular resin is suitable for, for example, a food or water contact application. During the processing of conventional polyester resins, the decomposition of the resin during processing (e.g., as accompanies a change such as a loss in IV) may lead to the formation of acetaldehyde. In one embodiment of the present invention, a process that includes processing a polyester resin is carried out with a relatively lower rate of increase in the acetaldehyde concentration relative to the concentration of acetaldehyde in the polyester resin prior to the processing such as subjecting the polyester resin to a heat history that includes melting and solidifying the polyester resin.

In one embodiment of the invention, the amount of acetaldehyde formed during the processing of the resin made without solid-state polymerization may be less than the amount of acetaldehyde formed during the processing of a conventional resin made with a process including solid-state polymerization. Preferably, during the processing of a resin made without solid-state polymerization, the amount of acetaldehyde formed during processing is no more than the amount of acetaldehyde formed during the processing of a conventional resin made with a process including solid-state polymerization. More preferably, the amount of acetaldehyde formed during the processing of the invention is at least 5% less than the amount of acetaldehyde formed during the processing of a conventional resin, more preferably at least 10% less, even more preferably at least 15% less, further preferably at least 20%, even more preferably at least 25% less, especially preferably at least 30% less than the amount of acetaldehyde formed in the conventional resin, and more preferably at least 50% less than the amount of acetaldehyde formed during the processing of a conventional polyester resin. The amount of the reduction in acetaldehyde is calculated by measuring the acetaldehyde before and after the melting and processing of the invention and determining the change in acetaldehyde formed relative to the amount of acetaldehyde formed in the conventional resin.

During normal processing of polyester resins (e.g., during the melting and processing of conventional resins), it is not uncommon for the acetaldehyde concentration in the polymer (e.g., the molded article) to be 300% to 1,000% greater than the amount of acetaldehyde present in the resin, e.g., in the pellets and/or chips, before processing (e.g., before melting and injection molding to form a preform). In the invention the amount of acetaldehyde is likely to increase in the resin after processing in the absence of acetaldehyde scavengers or reducing agents. However, the increase in acetaldehyde concentration observed in the invention may be less than the increase in acetaldehyde concentration observed when melting and/or processing conventional polyester resins made by solid-state polymerization. In one embodiment, the acetaldehyde concentration in a molded article of the invention increases by no more than 500% after melting and processing (e.g., conventional injection molding of the resin to form a bottle preform), preferably no more than 300%, preferably no more than 250%, even more preferably no more than 225%, even further preferably no more than 200%, especially preferably no more than 175%, even further preferably no more than 150%, especially preferably no more than 100%. In other embodiments the amount of acetaldehyde increase observed for the virgin resin in comparison to the virgin resin after processing (e.g., injection molding) is no more than a 100% increase in acetaldehyde.

In a further embodiment of the invention the polymeric compositions of the invention contain one or more additives such as fillers. Fillers may include materials such as clays, nanomaterials and/or other polymeric materials, e.g., nylon.

The polyester compositions of the invention preferably contain a PET resin that contains copolymerized IPA monomer units. The invention encompasses at least a low-IPA and a high-IPA PET resin. For example, a low-IPA composition (i) which contains a PET resin having an amount of IPA monomer units of up to 6% by mol. In a preferred embodiment the low-IPA PET resin contains up to 5 mol % of IPA monomer units. Most preferably, the low-IPA PET resin contains from 2-4 mol % of polymerized IPA monomer units based upon the total number of moles dicarboxylic acid monomer units. Hereinafter the PET resin containing a low amount of IPA monomer units is referred to as the low-IPA PET resin.

Another PET resin is a high-IPA PET resin, for example (ii) high-IPA PET resin wherein IPA monomer units are present in an amount of from 6-30 mol %, preferably from 8-25%, more preferably from 9-20% and most preferably about 10-15% by mol based on the total number of moles of dicarboxylic acids in the PET polymer. Other ranges include 10-28%, 12-30%, and all ranges and sub-ranges appearing between and any of 14%, 16%, 18%, 20%, 22%, 24%, and 26% and/or the above stated ranges.

Thus, in preferred embodiments, the polyester compositions of the invention may include a PET matrix resin such as the low-IPA resin or the high-IPA resin described above together with one or more additives such as an inorganic filler or a co-barrier resin. Preferably a composition comprising the low-IPA resin contains from 2-8% by weight of a co-barrier resin, where % by weight is based on the total weight of the composition. More preferably, the co-barrier resin is present in the low-IPA PET matrix resin in an amount of from 3-6% by weight, and even more preferably the co-barrier resin is present in an amount of from 4-5% by weight.

In another preferred embodiment, the PET composition of the invention contains the high-IPA resin as a matrix and a co-barrier resin. The co-barrier resin is preferably present in the matrix of the high-IPA PET resin in an amount of up to 2.5% by weight, preferably less than 1.5% by weight, more preferably up to 0.5% by weight, where percent by weight is based on the total weight of the composition.

In a preferred embodiment the polymeric polyester composition contains a solid clay filler and/or nanomaterial. The clay filler is preferably in the form of an expanded clay or expanded mica. Examples of expanded clays and/or micas include organo-clays. Some organoclay materials are preferred. Organoclays such as CLOISITE 93A, CLOISITE 30B, and other CLOISITE products from Southern Clay Products, Gonzalez, Tex. show excellent exfoliation in an MxD6 (6001 or 6007) resin matrix. The dosage of 30B or 93A organoclays may be about 5 wt. %. Other ranges that the filler may be present include 1-10 wt. %, 2-8 wt. %, and 3-6 wt. %. Preferably, the organoclay is present in a matrix containing an MXD6-containing resin and the organoclay is present in an amount of about 5% relative to the total MXD6 resins. The filler may be present on other amounts such as from 1 to 20% by weight, 2 to 15% by weight, 3 to 10% by weight and 6 to 8% by weight. Mixtures of the organoclay with an amine-containing resin may be melt blended with PET resins compositions to obtain a composition comprising a matrix resin, an organoclay filler and a co-barrier resin. This is one promising approach for nano-platelets to be indirectly dispersed in a polyester resin matrix.

Preferably the organoclay and/or nanomaterial materials are organically modified nanometer scale layered magnesium aluminum silicate platelets. Typically the organically modified organoclays are derived from platelets that are about 1 nanometer thick and from 70-150 nanometers across. The process of organically modifying the platelets includes contacting the platelets with organic chemicals such as quaternary ammonium salts. For example nanoparticle clays contacted with quaternary ammonium salts such as dimethyl benzyl hydrogenated tallow quaternary ammonium salt (2MBHT), methyl bis(2-hydroxyethyl) tallow quaternary ammonium salt (MT2EtOH), and methyl dihydrogenated tallow ammonium (M2HT) are preferred. Particle sizes may be about 6 micron but any particle size that permits homogeneous inclusion of the particles in the matrix and/or co-barrier resin may be used.

In a preferred embodiment the organoclay and/or nanomaterial is first dispersed in a co-barrier resin such as an MXDA-copolyamide such as one containing IPA and terephthalic acid together with an amount of ethylene glycol or other diol and MXDA (meta-xylene diamine). By first dispersing the inorganic filler such as organoclay filler in the co-barrier resin (e.g., in an MXDA-copolyamide resin) the inorganic filler may be better dispersed in the polyester matrix resin (e.g., the PET matrix resin).

The inorganic filler may be dispersed in the co-barrier resin in the solid state by mixing powders of the inorganic filler and the co-barrier resin. The mixture of powders may then be mixed directly with the molten matrix resin or, may be mixed with a molten resin after first melting the mixture of the co-barrier resin and inorganic filler.

In one embodiment a co-barrier/inorganic filler master batch is prepared. The inorganic filler is mixed with molten co-barrier resin to form pellets and/or strands of a master batch which contains the co-barrier resin as a matrix resin and, dispersed therein, the inorganic filler. The inorganic filler may be present in an amount of up to 25% by weight based on the entire weight of the co-barrier/inorganic filler master batch. Preferably, the inorganic filler is present in an amount of up to 20%, more preferably in an amount of up to 15%, in a further preferred embodiment the inorganic filler is present in the co-barrier/inorganic filler master batch mixture and/or resin in an amount of up to 10% by weight, more preferably from 1-5% by weight.

The inorganic filler may be present in an amount of 0.05 to 2.5% by weight based on the total weight of the composition. More preferably, the inorganic filler is present in an amount of 0.1 to 2.0% by weight, even more preferably from 0.5 to 1.5% by weight and most preferably the inorganic filler is present in an amount of about 1% by weight.

In another preferred embodiment the polymeric polyester composition (e.g., PET composition) is mixed with a polymer filler such as a powdered amide-based polymer (e.g., nylon) or other thermoplastic materials. The resins of the invention (e.g., polyester resin compositions) may contain one or more polyamides or thermoplastics. Any polyamide may be present in the invention compositions including, for example: poly(m-xylene adipamide), poly(hexamethylene adipamide), polycaprolactam, poly(hexamethylene isophthalamide), and poly(hexamethylene isophthalamide-co-terephthalamide). Polyamides that are co-polymers of, for example, a polyester may also be present. Any polyamide/polyester co-polymer may be present in the invention composition including: polyamides that include polymerized units of isophthalic acid, terephthalic acid, cyclohexanedicarboxylic acid, meta-xylenediamine, para-xylenediamine, 1,3- or 1,4-cyclohexane(bis)methylene, one or more aliphatic acids with 6-12 carbon atoms, aliphatic amino acids with 6-12 carbon atoms, lactams with 6-12 carbon atoms, aliphatic diamines with 4-12 carbon atoms. Polyamide dendrimers may be present including polyamide dendrimers that contain polymerized dicarboxylic acids. Preferred polyamides are poly(m-xylylene adipamide), poly(hexamethylene adipamide), polycaprolactam, poly(hexamethyleneisophthalamide, poly(hexamethyleneadipamide-co-isophthalamide), poly(hexamethyleneadipamide-co-terephthalamide). Especially preferred is MXD6 which is a polymer of meta-xylylenediamine and adipic acid. Also preferred are copolymers of MXD6 with a phthalic acid. Blends of MXD6 with one or more polyester resins such as polyethylene terephthalate and/or polyethylene terephthalate resins modified with meta-xylylenediamine. The polymer filler may be present in amounts of from 1-20%, 2-18%, 4-16%, 5-15%, 6-12%, 8-11% and any range or sub-range between the stated values, based on the total weight of the resins.

Preferred resin compositions of the invention include blends or mixtures of PET with at least one of a polyamide, such as MXD6, or a MXD6 polymer wherein up to 25% of the adipic acid monomer units are replaced with a dicarboxylic acid such as isophthalic acid. In place of the copolymer a blend of PET with a different polyester such as polyethylene naphthalate (PEN) may be used.

An organic filler may preferably be present in an amount of up to 10% by weight. More preferably the organic filler is present in an amount of from 1 to 8% by weight. Even more preferably the organic filler is present in an amount of from 3 to 6% by weight based on the total weight of the composition. Most preferably the organic filler is present in an amount of about 5% by weight.

In stretch blow molding, the PET chains may align during bi-axial orientation. The presence of nylon may produce even closer chain alignment when compared to PET due to the intermolecular force of hydrogen bonding. For the bottle molded from standard PET resins, one may observe about 40% barrier improvement if one decreases the temperature of the PET chains by 12° C. from ambient temperature, for example about 25° C. Lowering the temperature of the PET chains also decreases its effective free-volume. Molecular orientation tends to increase the interfacial area of the blend. The secondary bonding (interaction) between PET and MXD6 (or MXIPA) may be stronger to reduce the chain mobility in such a way to reduce the effective free-volume of the blend.

TEM is a good technique to take the two-dimensional (2-D) micro-graphs of minor-phase dispersion in a continuous phase. TEM is also useful in understanding the effective dispersion (exfoliation or intercalation) of an organic-modified nano-clay in an organic polymer matrix. For incompatible PET/MXD6 blends, the MXD6 in a minor phase is usually stained with a 1% aqueous phosphotungstic acid (12 $WO_3 \cdot H_3PO_4 \cdot xH_2O$), which tags amine groups and ends. If it is necessary to stain the PET, one would use $RuO_4$ vapor, which reacts with acid ends. If the specimen was not stained, the dark lines in the TEM image are the edges of dispersed organo-clay platelets at high magnification. The platelet or laminar morphology accounts for the substantial reduction of gas permeation rates in immiscible blends.

The performance of mono-layer resin barrier bottles depends on, for example, the base resins, the degree of crystallinity, molecular orientation of pre-forms by stretching, and the resulting material distribution of bottles. PET pre-forms are generally designed to take advantage of the strong strain-hardening effect to achieve good material distribution. Intrinsic viscosity (IV) has a fairly strong effect on the strain-hardening behavior of PET. For CSD applications, injection-molded pre-forms may preferably have an IV of from 0.70 to 0.95 to produce a normal stretch for good strain hardening.

EXAMPLES

The intrinsic viscosity of samples of a polyester resin composition were tested. Control sets included a polyester resin composition containing a conventional, commercially available polyester resin made with a process that included solid-state polymerization. The intrinsic viscosity of the polyester resin composition was measured on virgin material before being subjected to melting other than the initial pelletization process.

A polyester resin composition containing only polyester resin made by a method not including solid-state polymerization was compared with the conventional polyester resin. Except for IV, the resin produced by non-solid-state polymerization (e.g., a resin according to the invention) was the same in composition as the conventional, commercially available polyester resin except for the difference in the method of manufacture.

The intrinsic viscosities before and after processing (i.e., before and after injection molding to form a bottle pre-form) are provided in Tables 1-4.

Melting and Processing Conditions:

The resins were dried before injection molding. The dryer set point was 300° F. with a dew point of from −25 to −47° F. Drying was carried out for at least 6 hours prior to injection molding. The bottle perform mold was water cooled with a core supply at 50° F. The static temperature of the molten resin was from 537 to 563° F. with a peak melt temperature of from 572 to 609° F. Hydraulic injection pressure was from 1,175 to 1,750 psi. Manifold set temperatures (total 5) were 540° F. Shooting pot head and zone temperatures were from 535 to 555° F. Extruder zones were from 535 to 580° F. Like resins were processed under like conditions. Examples of extruder profiles are provided below: BHE-535° F.; BH-535° F.; E6-535° F.; E5-540° F.; E4-540° F.; E3-545° F.; E2-548° F.; E1-550° F. BHE-540° F.; BH-540° F.; E6-542° F.; E5-547° F.; E4-547° F.; E3-552° F.; E2-555° F.; E1-557° F. BHE-545° F.; BH-545° F.; E6-549° F.; E5-554° F.; E4-554° F.; E3-559° F.; E2-562° F.; E1-564° F. BHE-541° F.; BH-546° F.; E6-546° F.; E5-546° F.; E4-554° F.; E3-556° F.; E2-558° F.; E1-560° F. BHE-548° F.; BH-553° F.; E6-556° F.; E5-556° F.; E4-561° F.; E3-566° F.; E2-568° F.; E1-570° F. BHE-555° F.; BH-560° F.; E6-566° F.; E5-566° F.; E4-571° F.; E3-576° F.; E2-578° F.; E1-580° F.

TABLE 1

SSP CSD/Beer Grade

| Sample | Form | Cavity | IV |
|---|---|---|---|
| Pre-Dryer Sample: Box 1 | Chip | NA | 0.835 |
| Pre-Dryer Sample: Box 2 | Chip | NA | 0.837 |
| Pre-Dryer Sample: Box 3 | Chip | NA | 0.840 |
| Post-Dryer Sample: A (566° F.) | Chip | NA | 0.829 |
| Post-Dryer Sample: B (571° F.) | Chip | NA | 0.823 |
| Post-Dryer Sample: C (576° F.) | Chip | NA | 0.826 |
| Preform Sample: A (566° F.) | Preform | 8 | 0.799 |
|  | Preform | 25 | 0.799 |
| Preform Sample: B (571° F.) | Preform | 8 | 0.797 |
|  | Preform | 25 | 0.797 |
| Preform Sample: C (576° F.) | Preform | 8 | 0.791 |
|  | Preform | 25 | 0.798 |

The resin made without solid-state polymerization was subjected to the same drying and injection molding conditions as the conventional solid-state polymerized resin. The intrinsic viscosity measurements are provided in Table 2 below.

TABLE 2

Non-SSP CSD/Beer Grade

| Sample | Form | Cavity | IV |
|---|---|---|---|
| Pre-Dryer Sample: Octabin 29 | Chip | NA | 0.801 |
| Pre-Dryer Sample: Octabin 30 | Chip | NA | 0.799 |
| Post-Dryer Sample: D (565° F.) | Chip | NA | 0.804 |
| Post-Dryer Sample: E (570° F.) | Chip | NA | 0.810 |
| Post-Dryer Sample: F (575° F.) | Chip | NA | 0.816 |
| Preform Sample: D (565° F.) | Preform | 8 | 0.792 |
|  | Preform | 25 | 0.790 |
| Preform Sample: E (570° F.) | Preform | 8 | 0.791 |
|  | Preform | 25 | 0.792 |
| Preform Sample: F (575° F.) | Preform | 8 | 0.799 |
|  | Preform | 25 | 0.798 |

As can be seen from Tables 1 and 2 above, the intrinsic viscosity of the resin made by a process including solid-state polymerization changes by about 0.04 dL/g. In comparison, a resin made without solid-state polymerization (e.g., the resin of the invention) shows a reduction in intrinsic viscosity of only about 0.015 dL/g when the processing of both resins are carried out under the same conditions.

A similar test was carried out on a polyester resin for use in forming a water bottle. The intrinsic viscosity measurements for the resin made with solid state polymerization is compared with data for a resin made without solid-state polymerization in Tables 3 and 4 below, respectively.

TABLE 3

SSP Water Grade

| Sample | Form | Cavity | IV |
|---|---|---|---|
| Pre-Dryer Sample: Box 4 | Chip | NA | 0.741 |
| Pre-Dryer Sample: Box 5 | Chip | NA | 0.740 |
| Pre-Dryer Sample: Box 6 | Chip | NA | 0.747 |
| Pre-Dryer Sample: Box 7 | Chip | NA | 0.739 |
| Post-Dryer Sample: G (N/A) | Chip | NA | 0.744 |
| Post-Dryer Sample: H (549° F.) | Chip | NA | 0.732 |
| Post-Dryer Sample: I (552° F.) | Chip | NA | 0.738 |
| Preform Sample: G (N/A) | Preform | 8 | 0.721 |
|  | Preform | 25 | 0.712 |
| Preform Sample: H (549° F.) | Preform | 8 | 0.711 |
|  | Preform | 25 | 0.710 |
| Preform Sample: I (552° F.) | Preform | 8 | 0.714 |
|  | Preform | 25 | 0.716 |

TABLE 4

Non-SSP Water Grade

| Sample | Form | Cavity | IV |
|---|---|---|---|
| Pre-Dryer Sample: Octabin 69 | Chip | NA | 0.774 |
| Pre-Dryer Sample: Octabin 70 | Chip | NA | 0.754 |
| Post-Dryer Sample: J (554° F.) | Chip | NA | 0.760 |
| Post-Dryer Sample: K (559° F.) | Chip | NA | 0.766 |
| Post-Dryer Sample: L (562° F.) | Chip | NA | 0.769 |
| Preform Sample: J (554° F.) | Preform | 8 | 0.753 |
|  | Preform | 25 | 0.760 |
| Preform Sample: K (559° F.) | Preform | 8 | 0.764 |
|  | Preform | 25 | 0.758 |
| Preform Sample: L (562° F.) | Preform | 8 | 0.768 |
|  | Preform | 25 | 0.766 |

As was observed for the CSD/Beer bottle resin of Tables 1 and 2, the reduction in intrinsic viscosity of a polyester resin for use in manufacturing water bottles is substantially lower when the resin is manufactured without solid-state polymerization in comparison to a conventional resin that is manufactured without solid-state polymerization. For example, the intrinsic viscosity change in the resin that is used in the process of the invention is about 0.01 dL/g whereas the intrinsic viscosity change in the conventional resin is about 0.03 dL/g.

Two CSD/Beer resins were tested for bottle qualification on 2 liter bottles. Preforms were injection molded on a 48-cavity mold and the bottles were stretch blow molded.

Summary of Tests

Both resins passed all the qualification tests to date with comparable results.

Test methods, specifications and quantitative data are shown below. The sidewall rigidity test has no specification.

TABLE 5

| Test | Method | Non-SSP | SSP |
|---|---|---|---|
| Drop Impact | Test 1 | Pass | Pass |
|  | Test 2 | Pass | Pass |
| Burst Pressure | Test 3 | Pass | Pass |
|  | Test 4 | Pass | Pass |
| Sidewall Rigidity | Test 5 | Info Only | Info Only |
| Thermal Stability | Test 6 | Pass | Pass |
| Vertical Load | Test 7 | Pass | Pass |
|  | Test 8 | Pass | Pass |
| Volumes | Test 9 | Pass | Pass |
|  | Test 10 | Pass | Pass |
| Stress Crack | Test 11 | Pass | Pass |
| Sidewall Tensile | Test 12 | Info Only | Info Only |
| AA Bottle Headspace | Test 13 | Pass | Pass |
|  | Test 14 | Pass | Pass |
| $CO_2$ Permeation | Test 15 | Pass | Pass |

Test Procedures, Specification and Results

A) Drop Impact—Test 1

Twenty-four bottles carbonated to 4.2+/−0.1 gas volumes. Twelve bottles conditioned to 70° F. and twelve bottles conditioned to 40° F., dropped onto hot rolled steel plate at 2 m height. Specification—no failures.

TABLE 6

|  | Non-SSP | SSP |
|---|---|---|
| 40° F. | All pass | All pass |
| 70° F. | All pass | All pass |

B) Drop Impact—Test 2

Twenty-four bottles carbonated to 4.00+/−0.05 gas volumes. All bottles conditioned to 70° F. and dropped onto steel angle plate at 6 ft height. Twelve bottles dropped vertically and twelve bottles dropped horizontally. Specification—no failures.

TABLE 7

|  | Non-SSP | SSP |
|---|---|---|
| Vertical drop | All pass | All pass |
| Horizontal drop | All pass | All pass |

C) Burst Pressure—Drop Impact—Test 3

Twelve bottles initially pressurized to 100 psig, held for 13 s and then pressure ramped up at 10 psi per second to 300 psig or failure. Specification—bottles must withstand 100 psig minimum. Pass.

TABLE 8

| Pressure (psig) | Non-SSP | SSP |
|---|---|---|
| Average | 172.0 | 183.0 |
| St. Dev. | 21.8 | 17.8 |
| Min. | 142.0 | 141.0 |
| Max | 194.9 | 201.9 |

D) Burst Pressure—Drop Impact—Test 4

Six bottles tested. No ramp or initial pressure hold specified. Specification—No failures less than 135 psig and average—3 St. Dev.>135 psig for base failures and >120 psig for side panel failures. Pass.

TABLE 9

| Pressure (psig) | Non-SSP | SSP |
|---|---|---|
| Average | 178.3 | 190.0 |
| St. Dev. | 16.0 | 15.0 |
| Min. | 148.0 | 146.0 |
| Max | 189.9 | 200.9 |
| Average - 3 St. Dev. | 130.4 | 145.0 |

E) Sidewall Rigidity—Test 5

Twelve empty bottles. Deflect label panel 12 mm with a 8 mm round probe. Record the load at 12 mm deflection. Repeat at four equal points on the bottle. No specification.

TABLE 10

| Load @ 12 mm (0.48 inches) (lbf) | Non-SSP | SSP |
|---|---|---|
| Average | 222.81 | 230.16 |
| St. Dev. | 6.5 | 6.1 |
| Maximum | 234.09 | 242.68 |
| Minimum | 207.78 | 210.47 |

F) Thermal Stability—Test 6

Measure required bottle dimensions on twelve empty bottles. Carbonate the same twelve bottles carbonated to 4.2+/−0.1 gas volumes. Store bottles at 100° F. for 24 hours. Measure required bottle dimensions. Specification <3% height change, <3% diameter change, <28 mm (1.1 inches) change in fill line and <9 mm (0.35 inches) final perpendicularity. All passed.

TABLE 11

|  | Non-SSP Average | Std Dev | SSP Average | Std Dev |
|---|---|---|---|---|
| Weight (grams) | 50.1 | 0.06 | 50.1 | 0.04 |
| Initial Height (inches) | 11.865 | 0.002 | 11.863 | 0.003 |
| % Height Change | 1.39% | 0.001 | 1.40% | 0.001 |
| Change in Fill Line (inches) | 0.526 | 0.010 | 0.512 | 0.018 |
| Base Clearance |  |  |  |  |
| Initial (inches) | 0.186 | 0.004 | 0.191 | 0.005 |
| Final (inches) | 0.177 | 0.003 | 0.172 | 0.005 |
| Final Perpendicularity | 0.043 | 0.023 | 0.062 | 0.030 |
| % Diameter Change |  |  |  |  |
| % Neck Change | 0.20% | 0.001 | 0.18% | 0.001 |
| % Upper Label Change | 1.36% | 0.000 | 1.36% | 0.001 |
| % Middle Label Change | 1.65% | 0.001 | 1.59% | 0.001 |
| % Lower Label Change | 1.96% | 0.001 | 1.84% | 0.001 |
| Final Carbonation | 3.73 | 0.032 | 3.75 | 0.022 |
| Base Weight (grams) | 15.9 | 0.236 | 15.9 | 0.184 |

TABLE 11-continued

|  | Non-SSP Average | Std Dev | SSP Average | Std Dev |
|---|---|---|---|---|
| Panel Weight (grams) | 20.1 | 0.200 | 20.2 | 0.162 |
| Shoulder Weight (grams) | 14.6 | 0.105 | 14.6 | 0.087 |

G) Vertical Load—Test 7

Twelve empty bottles. Platten at 25 mm above finish and headspeed at 20 in/min. Test to failure and record maximum load. Specification average of 66 lbs and none less than 44 lbs.

TABLE 12

| Max Load (lbf) | Non-SSP | SSP |
|---|---|---|
| Average | 67.61 | 67.37 |
| St. Dev. | 7.928 | 5.924 |
| Maximum | 89.64 | 90.36 |
| Minimum | 57.37 | 60.70 |
|  | PASS | PASS |

H) Vertical Load—Test 8

Twenty-four empty bottles aged for 72 hours. Headspeed at 20 in/min. Test at 0.15 deflection. Specification 35 lbs and average—3(standard deviation)>35 lbs.

TABLE 13

| Compressive Load at 0.15" deflection (lbf) | Non-SSP | SSP |
|---|---|---|
| Average | 62.3 | 62.3 |
| St. Dev. | 8.400 | 6.714 |
| Maximum | 86.4 | 84 |
| Minimum | 51.5 | 53.8 |
| Average - 3(St. Dev.) | 37.1 | 42.2 |
|  | PASS | PASS |

I) Volumes—Test 9

Twelve bottles filled to overflow and fill point. Specification—no bottles>+/−1% on volume, average <+/−0.5% on volume. Passed J) Volumes—Test 10

Six bottles filled to overflow and fill point. Specification—no bottles >17 ml or <9 ml, average not >10 ml or <0 ml. Passed

TABLE 14

|  |  | Non-SSP | SSP |
|---|---|---|---|
| Overflow Capacity | Ave. (mL) | 2077.40 | 2076.70 |
|  | St. Dev. | 0.38 | 0.34 |
|  | Min | 2076.82 | 2076.02 |
|  | Max | 2078.02 | 2077.22 |
| Fill Point Capacity | Ave. (mL) | 2027.69 | 2026.27 |
|  | St. Dev. | 1.42 | 0.76 |
|  | Min | 2026.41 | 2025.61 |
|  | Max | 2031.02 | 2028.51 |

K) Stress Crack—Test 11

Each bottle is filled to fill level with 22+/−2° F. water, pressurized to 77+/−0.5 psig and held for 5 minutes. Each bottle is placed in 0.2% NaOH solution and the time to failure recorded. Passed

TABLE 15

|  |  | Non-SSP | SSP |
|---|---|---|---|
| Failure Time | Average | 1:06:26 | 1:08:20 |
|  | St. Dev. | 0:54:48 | 0:51:30 |
|  | Max | 3:00:00 | 2:51:03 |
|  | Min | 0:12:48 | 0:17:43 |
| Base Weight (g) | Average | 15.8 | 15.7 |
|  | St. Dev. | 0.2 | 0.2 |
|  | Max | 16.3 | 16.0 |
|  | Min | 15.5 | 15.3 |

L) Sidewall Tensile—Test 12

Sections of the bottle sidewall are cut from the bottle and cut into a dog bone tensile bar. Six samples are made from each sample. Three samples are cut in the axial direction of the bottles and three samples in the radial direction of the bottle.

TABLE 16

|  |  | Non-SSP Radius | SSP Radius | Non-SSP Axial | SSP Axial |
|---|---|---|---|---|---|
| Modulus (Young's - Cursor) | Average | 312405 | 322751 | 220720 | 162800 |
|  | St. Dev | 15335.73187 | 22514.1 | 12932.8 | 9927.8 |
| Max Load | Average | 96.345 | 91.98 | 73.76 | 74 |
|  | St. Dev | 0.4 | 1.5 | 6.5 | 2.7 |
| Stress @ Max Load | Average | 31670.07 | 31967.46 | 27047.22 | 26870.67 |
|  | St. Dev | 142.1 | 319.9 | 2188.8 | 1037.9 |
| Strain @ Max Load | Average | 38.26 | 35.9 | 214.32 | 265.16 |
|  | St. Dev | 0.9 | 2.1 | 26.7 | 15.2 |
| Stress @ Yield | Average | 31670.07 | 31967.46 | 13075.27 | 13245.95 |
|  | St. Dev | 142.1 | 319.9 | 338.7 | 219.7 |
| Strain @ Break | Average | 40.505 | 37.84 | 216.66 | 267.94 |
|  | St. Dev | 1.0 | 1.9 | 26.7 | 16.1 |

M) Bottles Headspace AA—Test 13

Six bottles purged after 24 hours with nitrogen. Specification <5 µg/l. Passed.

TABLE 17

| (µg/l) | Non-SSP | Non-SSP |
|---|---|---|
| Average | 1.1 | 1.0 |
| St. Dev. | 0.1 | 0.1 |
| Maximum | 1.2 | 1.2 |
| Minimum | 0.9 | 0.8 |

N) Bottles Headspace AA—Test 14

Six bottles stored at 70° F. for 24 hours and then purged with nitrogen. Specification <3 µg/l. Passed.

TABLE 18

|  | Non-SSP | Non-SSP |
|---|---|---|
| Average | 1.2 | 0.9 |
| St. Dev. | 0.1 | 0.2 |
| Maximum | 1.4 | 1.2 |
| Minimum | 1.1 | 0.7 |

O) $CO_2$ Permeation—Test 15

Carbonate with dry ice to 4.0+/−0.1 gas volumes. After 49 days 17.5% loss or less. Specification >14 weeks. Passed.

TABLE 19

| Non-SSP | SSP |
|---|---|
| 15.1 weeks (+/−0.3) | 14.9 weeks (+/−0.3) |

A comparison of mold shrink between non-SSP resins (e.g., invention) and SSP resins is tabulated below in Tables 20-22.

TABLE 20

| | T 10° Part Line | | T 90° Part Line | | | | Internal Diameter (ID) | |
|---|---|---|---|---|---|---|---|---|
| | Non-SSP | SSP | Non-SSP | SSP | Ovality Non-SSP | Ovality SSP | Non-SSP | SSP |
| Spec | | | | | | | | |
| Nominal | 1.080 | 1.080 | 1.080 | 1.080 | | | 0.856 | 0.856 |
| Minimum | 1.075 | 1.075 | 1.075 | 1.075 | | | 0.851 | 0.851 |
| Maximum | 1.085 | 1.085 | 1.085 | 1.085 | | | 0.861 | 0.861 |
| Actual | | | | | | | | |
| Average | 1.079 | 1.079 | 1.078 | 1.078 | 0.001 | 0.001 | 0.857 | 0.857 |
| Minimum | 1.077 | 1.077 | 1.077 | 1.077 | 0.000 | 0.001 | 0.855 | 0.856 |
| Maximum | 1.081 | 1.080 | 1.080 | 1.080 | 0.001 | 0.000 | 0.858 | 0.859 |
| Difference | 0.004 | 0.003 | 0.003 | 0.004 | 0.001 | 0.001 | 0.003 | 0.003 |
| Std Dev | 0.0008 | 0.0005 | 0.0009 | 0.0010 | | | 0.0008 | 0.0012 |

TABLE 21

| | E 10° Part Line | | E 90° Part Line | | | | A Dimension | |
|---|---|---|---|---|---|---|---|---|
| | Non-SSP | SSP | Non-SSP | SSP | Ovality Non-SSP | Ovality SSP | Non-SSP | SSP |
| Spec | | | | | | | | |
| Nominal | 0.982 | 0.982 | 0.982 | 0.982 | | | 1.101 | 1.101 |
| Minimum | 0.977 | 0.977 | 0.977 | 0.977 | | | 1.096 | 1.096 |
| Maximum | 0.987 | 0.987 | 0.987 | 0.987 | | | 1.106 | 1.106 |
| Actual | | | | | | | | |
| Average | 0.982 | 0.982 | 0.981 | 0.980 | 0.001 | 0.001 | 1.100 | 1.100 |
| Minimum | 0.981 | 0.980 | 0.980 | 0.980 | 0.000 | 0.000 | 1.098 | 1.098 |
| Maximum | 0.983 | 0.984 | 0.981 | 0.981 | 0.002 | 0.003 | 1.102 | 1.101 |
| Difference | 0.001 | 0.003 | 0.002 | 0.002 | 0.002 | 0.003 | 0.003 | 0.003 |
| Std Dev | 0.0005 | 0.0010 | 0.0005 | 0.0005 | | | 0.0008 | 0.0007 |

TABLE 22

| | SRL | | D Dimension | | S Dimension | |
|---|---|---|---|---|---|---|
| | Non-SSP | SSP | Non-SSP | SSP | Non-SSP | SSP |
| Spec | | | | | | |
| Nominal | 0.827 | 0.827 | 0.555 | 0.555 | 0.067 | 0.067 |
| Minimum | 0.817 | 0.817 | 0.547 | 0.547 | 0.062 | 0.062 |
| Maximum | 0.837 | 0.837 | 0.563 | 0.563 | 0.072 | 0.072 |
| Actual | | | | | | |
| Average | 0.826 | 0.826 | 0.556 | 0.555 | 0.068 | 0.067 |
| Minimum | 0.825 | 0.825 | 0.554 | 0.554 | 0.066 | 0.066 |
| Maximum | 0.828 | 0.828 | 0.557 | 0.557 | 0.069 | 0.069 |
| Difference | 0.003 | 0.002 | 0.003 | 0.004 | 0.003 | 0.003 |
| Std Dev | 0.0006 | 0.0007 | 0.0007 | 0.0007 | | |

The mold shrink data show that the resin of the invention may provide the same mold shrink of conventional resins prepared with solid state polymerization.

The invention claimed is:

1. A process for making a shaped article from a solid polyester resin containing a polyester polymer, comprising: forming the shaped article by melting and processing pellets of the polyester polymer without changing the intrinsic viscosity of the polyester polymer by more than 0.025 dL/g;

wherein the polyester polymer before the melting has an intrinsic viscosity of from 0.70 to 0.95, and wherein the pellets of the polyester resin are: (i) made without solid-state polymerization, (ii) made with high IV melt polycondensation, and (iii) made by direct latent heat crystallization in which an extruded stream of the molten polyester polymer is quenched in a water bath containing water having a temperature of 80° C. or higher.

2. The process as claimed in claim 1, further comprising: polymerizing a mixture comprising one or more diol units and one or more carboxylic acid units, or esters of a carboxylic acid, to form a molten resin containing polymerized monomer units, and then quenching the molten polymer in the water bath to form the polyester resin.

3. The process as claimed in claim 1, wherein the processing is at least one selected from the group consisting of injection molding, extrusion molding, sheet molding, reaction injection molding, injection blow molding, thermoforming, and one- and two-step stretch blow molding.

4. The process as claimed in claim 1, wherein the polyester polymer has an intrinsic viscosity of from 0.75 to 0.85 dL/g before the molding.

5. The process as claimed in claim 1, wherein both the polyester polymer before the forming and the polyester resin of the shaped article have an intrinsic viscosity of about 0.80 dL/g.

6. The process as claimed in claim 1, wherein the intrinsic viscosity of the polyester polymer of the shaped article is decreased by no more than 0.02 dL/g in comparison to the intrinsic viscosity of the polyester polymer before the melting.

7. The process as claimed in claim 1, wherein the intrinsic viscosity of the polyester polymer of the shaped article is decreased by no more than 0.015 dL/g in comparison to the intrinsic viscosity of the polyester polymer before the melting.

8. The process as claimed in claim 1, wherein the intrinsic viscosity of the polyester polymer of the shaped article is decreased by no more than 0.01 dL/g in comparison to the intrinsic viscosity of the polyester polymer before the melting.

9. The process as claimed in claim 1, wherein the intrinsic viscosity of the polyester polymer of the shaped article is decreased by no more than 0.005 dL/g in comparison to the intrinsic viscosity of the polyester polymer before the melting.

10. The process as claimed in claim 1, wherein the intrinsic viscosity of the polyester polymer of the shaped article is the same as the intrinsic viscosity of the polyester polymer before the melting.

11. The process as claimed in claim 1, wherein the processing is injection molding, and the shaped article is a preform or a parison,
wherein the process further comprises:
stretch blow molding of the preform or the parison.

12. The process as claimed in claim 1, wherein the polyester resin comprises polymerized units of isophthalic acid in an amount of from 0 to 30 mol % based on the total number of mols of all of the dicarboxylic acid monomer units in the polyester resin.

13. The process as claimed in claim 1, wherein the polyester resin comprises polymerized units of isophthalic acid in an amount of from 0 to 5 mol % based on the total number of mols of all of the dicarboxylic acid monomer units in the polyester resin.

14. The process as claimed in claim 1, wherein the polyester resin comprises polymerized units of isophthalic acid in an amount of from 5 to 25 mol % based on the total number of mols of all of the dicarboxylic acid monomer units in the polyester resin.

15. The process as claimed in claim 1, wherein the solid polyester resin comprises polymerized units of isophthalic acid in an amount of from 5 to 15 mol %.

16. The process as claimed in claim 1, wherein the solid polyester resin comprises reacted groups of terephthalic acid and ethylene glycol.

17. A process for forming a molded article from a polyester resin containing a polyester polymer, comprising;
forming the molded article by melting and processing pellets of the polyester resin without drying or partially drying the polyester resin before the melting and the processing;
wherein the polyester polymer has an intrinsic viscosity of from 0.7 to 0.95 dL/g before the melting and the intrinsic viscosity of the polyester polymer after the melting and the processing has decreased by no more than 0.05 dL/g, and
wherein the pellets of the polyester resin are: (i) made without solid-state polymerization, (ii) made with high IV melt polycondensation, and (iii) made by direct latent crystallization in which an extruded stream of the molten polyester polymer is quenched in a water bath containing water having a temperature of 80° C. or higher.

18. A process for forming a molded article from a solid polyester resin containing a polyester polymer, comprising;
forming the molded article by melting and processing a composition comprising pellets of the polyester resin and one or more additives,
wherein the polyester polymer has an intrinsic viscosity of from 0.7 to 0.95 dL/g before the melting and the processing and the intrinsic viscosity of the polyester polymer decreases by no more than 0.05 dL/g after the molding and the processing, and
wherein the pellets of the polyester resin are: (i) made without solid-state polymerization, (ii) made with high IV melt polycondensation, and (iii) made by latent crystallization in which an extruded stream of the molten polyester polymer is quenched in a water bath containing water having a temperature of 80° C. or higher.

19. The process as claimed in claim 18, wherein the composition comprises one or more additives selected from the group consisting of an acetaldehyde scavenger and an acetaldehyde reducer.

20. The process according to claim 1, wherein the temperature of the water in the water bath is 90° C. or higher.

21. The process according to claim 17, wherein the temperature of the water in the water bath is 90° C. or higher.

22. The process according to claim 18, wherein the temperature of the water in the water bath is 90° C. or higher.

23. The process according to claim 20, wherein the glass transition temperature of the polyester resin is 80-85° C.

24. The process according to claim 21, wherein the glass transition temperature of the polyester resin is 80-85° C.

25. The process according to claim 22, wherein the glass transition temperature of the polyester resin is 80-85° C.

26. The process according to claim 23, wherein the molten polyester polymer is quenched in an underwater pelletizer comprising the water bath.

27. The process according to claim 24, wherein the molten polyester polymer is quenched in an underwater pelletizer comprising the water bath.

28. The process according to claim 25, wherein the molten polyester polymer is quenched in an underwater pelletizer comprising the water bath.

29. The process according to claim 23, wherein the molten polyester polymer is quenched in an underwater pelletizer comprising the water bath to form opaque pellets of crystallized resin.

30. The process according to claim 24, wherein the molten polyester polymer is quenched in an underwater pelletizer comprising the water bath to form opaque pellets of crystallized resin.

31. The process according to claim 25, wherein the molten polyester polymer is quenched in an underwater pelletizer comprising the water bath to form opaque pellets of crystallized resin.

32. The process as claimed in claim 1, wherein the polyester resin is in the form of pellets after quenching in the water bath and which have an IV gradient of no more than 0.025.

33. The process as claimed in claim 1, wherein the polyester resin is in the form of pellets after quenching in the water bath and which have substantially no IV gradient.

34. The process as claimed in claim 14, wherein the polyester resin is in the form of pellets after quenching in the water bath and which have an IV gradient of no more than 0.025.

35. The process as claimed in claim 17, wherein the polyester resin is in the form of pellets after quenching in the water bath and which have substantially no IV gradient.

36. The process as claimed in claim 18, wherein the polyester resin is in the form of pellets after quenching in the water bath and which have an IV gradient of no more than 0.025.

37. The process as claimed in claim 18, wherein the polyester resin is in the form of pellets after quenching in the water bath and which have substantially no IV gradient.

* * * * *